(12) United States Patent
Ito et al.

(10) Patent No.: US 9,448,447 B2
(45) Date of Patent: Sep. 20, 2016

(54) LATERAL ELECTRIC FIELD TYPE LIQUID CRYSTAL DISPLAY DEVICE

(71) Applicant: NLT TECHNOLOGIES, LTD., Kawasaki, Kanagawa (JP)

(72) Inventors: Hideki Ito, Kawasaki (JP); Shinichi Nishida, Kawasaki (JP); Takahiko Watanabe, Kawasaki (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 122 days.

(21) Appl. No.: 14/018,960

(22) Filed: Sep. 5, 2013

(65) Prior Publication Data
US 2014/0071386 A1    Mar. 13, 2014

(30) Foreign Application Priority Data

Sep. 7, 2012 (JP) ................................. 2012-197956
Apr. 9, 2013 (JP) ................................. 2013-081098

(51) Int. Cl.
*G02F 1/1343* (2006.01)

(52) U.S. Cl.
CPC ................ *G02F 1/134363* (2013.01)

(58) Field of Classification Search
CPC ............. G02F 1/134363; G02F 2001/134372; G02F 2001/134381; G02F 1/133707
See application file for complete search history.

(56) References Cited

U.S. PATENT DOCUMENTS

| | | | | |
|---|---|---|---|---|
| 2003/0184699 A1* | 10/2003 | Matsumoto et al. | ......... | 349/141 |
| 2006/0215100 A1* | 9/2006 | Ito | .................... | G02F 1/134363 349/141 |
| 2008/0036930 A1* | 2/2008 | Konno et al. | .................. | 349/33 |

FOREIGN PATENT DOCUMENTS

JP          2006-267317 A       10/2006

* cited by examiner

*Primary Examiner* — Jessica M Merlin
(74) *Attorney, Agent, or Firm* — Sughrue Mion, PLLC

(57) ABSTRACT

A lateral electric field type liquid crystal display device includes substrates, liquid crystal put between the substrates, scan lines and data lines arranged on one of the substrates, and pixels each of whose boundary is defined by two scan lines and two data lines. In each pixel, a strip-shaped electrode and a common electrode are formed with an insulating film put thereamong, and the pixel electrode is arranged to extend close along one of the data lines. In each pixel, a part of the common electrode covering one of the data lines overlaps with the pixel electrode, the pixel electrode partially projects from the overlapping area, and a side edge of the projecting part of the pixel electrode is separated from a side edge of a part of the common electrode covering the other data line so as to generate a lateral electric field to drive the liquid crystal.

12 Claims, 18 Drawing Sheets

PROJECTION LENGTH "a" OF PIXEL ELECTRODE
FROM COMMON ELECTRODE (μm)

LATERAL ELECTRIC FIELD TYPE LIQUID CRYSTAL DISPLAY DEVICE

CROSS REFERENCE TO RELATED APPLICATIONS

This application is based on Japanese Patent Applications No. 2012-197956 filed on Sep. 7, 2012 and No. 2013-081098 filed on Apr. 9, 2013, in the Japan Patent Office, the entire content of which is hereby incorporated by reference.

TECHNICAL FIELD

The present invention relates to a liquid crystal display device of a lateral electric field type, and especially relates to an excellent-definition active-matrix addressing liquid crystal display device of a lateral electric field type with a high aperture ratio.

BACKGROUND

Recently, the use of terminals such as smartphones and tablet personal computers is being widespread rapidly. Those terminals are required to display much information of high image quality while keeping the screen size handy to carry about. To solve that, lateral electric field type liquid crystal display devices in the IPS (In-Plane Switching) mode and FFS (Fringe Field Switching) mode, which can provide a high resolution and an excellent viewing angle, are employed for their display devices, wherein an electric field almost parallel with a substrate of each display device is used so as to rotate liquid crystal molecules in a plane almost parallel with the substrate.

Generally, display devices in the IPS mode, which use a lateral electric field generated between a strip-shaped pixel electrode and a common electrode, are more excellent in viewing angle characteristics than display devices in the FFS mode, which use a fringe electric field generated by arranging a strip-shaped electrode on a tabular electrode. However, the IPS mode display devices can cause the following problems in pixels for achieving extremely high definition.

FIGS. 16 and 17 are a plan view illustrating a conventional IPS mode display device and its sectional view taken along the line XVII-XVII of FIG. 16, respectively (as a first example of conventional arts). In order to shield an electric field emitted by data lines 5, common electrode 1 is arranged so as to cover the data lines 5 with putting an insulating film between them. Pixel electrode 2 in a strip shape is arranged separately from the common electrode at a certain distance. FIGS. 16 and 17 further illustrate source electrode 3, thin-film semiconductor layer 4, scan lines 6, alignment direction of liquid crystal 7, lateral electric field 8, light-incident-side polarization plate 10, first transparent insulating substrate 11, gate insulating film 12, passivation film 13 and oriented film 14. In an excellent-definition liquid crystal display whose pixel size is about 90 μm or less, each of sub-pixels provided by dividing each pixel into R, G and B elements (R: sub-pixel for red, G: sub-pixel for green, B: sub-pixel for blue) becomes about 30 μm or less in horizontal size. Therefore, providing only one pixel electrode extending along the data lines, can increase the aperture ratio of pixels.

In many of conventional and general liquid crystal display devices in the IPS mode, a pixel electrode is arranged between common electrode parts arranged at the both side of a sub-pixel so as to make the spacing between the pixel electrode and each of the common electrode parts almost uniform. FIG. 18 shows electrode spacing between the common electrode and the pixel electrode for gradually decreasing sizes of one pixel under the condition that each data line 5 is 3 μm in width, common electrode 1 is 9 μm in width and pixel electrode 2 is 3 μm in width. Under this condition, the electrode spacing comes to 3 μm or less in pixels whose size is 50 μm or less. Such the pixels hardly secure the enough electrode spacing and can cause a significant deterioration of light-utilization efficiency, which is a problem.

On the other hand, JP-A No. 2006-267317 discloses a technique to enlarge the electrode spacing (as a second example of the conventional arts), wherein a set of a pixel electrode and a common electrode part is formed at each of the opposing sides of a pixel so as to form just one space between the pixel electrode and the common electrode in one pixel. FIGS. 19A and 19B illustrate such the conventional technique. FIG. 19A illustrates a plan view of one pixel and FIG. 19B illustrates its sectional view taken along the line XIXB-XIXB in FIG. 19A. This conventional technique provides the following structure shown in FIGS. 19A and 19B. In the structure, protrusion 101 is formed to cover each of data lines 106. Pixel electrode 105 and common electrode part 104 are formed on both side surfaces of each protrusion 101, respectively, so as to apply a lateral electric field to a space between the electrodes to drive liquid crystal. Further, FIGS. 19A and 19B illustrate glass substrate 100, first insulating film 102, second insulating film 103, second pixel electrode 105, first pixel electrode 107, storage capacity electrode 108, TFT 109, common electrode lines 110, gate line 111, first contact hole 112 and second contact hole 113.

Since there are no electrodes which cover spaces right above the data lines 106, this technique requires to make common electrode part 104 and pixel electrode 105 wider in order to avoid a leak of the electric field coming from the data lines 106. This structure drives liquid crystal by using a lateral electric field generated between sets of a common electrode part and a pixel electrode, but can cause a problem that an effective aperture ratio is hardly secured because of the above reason. Further, because this structure includes protrusions, more than the half of each pixel is occupied by the protrusion under the condition that the size of each pixel is 90 μm or less, which causes another problem that a treatment, such as a rubbing treatment, to define the initial alignment of liquid crystal molecules in an aperture section where no protrusions are arranged is hardly performed and it results in a deterioration of the image quality.

The present invention seeks to solve those problems.

SUMMARY

There are disclosed illustrative lateral electric field type liquid crystal display devices, as embodiments of the present invention. A lateral electric field type liquid crystal display device as an embodiment of the present invention is configured to perform a display control by changing a molecule orientation of homogeneous-aligned liquid crystal using an electric field almost parallel with substrates of the display device. The display device comprises: a first substrate and a second substrate facing each other; liquid crystal put between the first substrate and the second substrate; a plurality of scan lines and a plurality of data lines both arranged on the first substrate; and a plurality of pixels each of whose boundary is defined by two of the scan lines and two of the data lines. Each of the pixels includes a strip-shaped pixel electrode arranged to be closer to one of the two data lines than the other and to extend along the one of the two data lines, a common electrode including a first common electrode part covering the one of the two data lines and a second common electrode part covering the other of the two data lines, and an insulating film arranged between the pixel electrode and the common electrode with separating the pixel electrode from the common electrode. In each of the pixels, the first common electrode part and the pixel electrode overlap together to form an overlapping area, the pixel electrode includes a projecting part which projects from the overlapping area toward an inside of the each of the pixels, and a side edge of the projecting part of the pixel electrode is separated from a side edge of the second common electrode part so as to generate a lateral electric field thereamong to drive the liquid crystal.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

Figure 16:
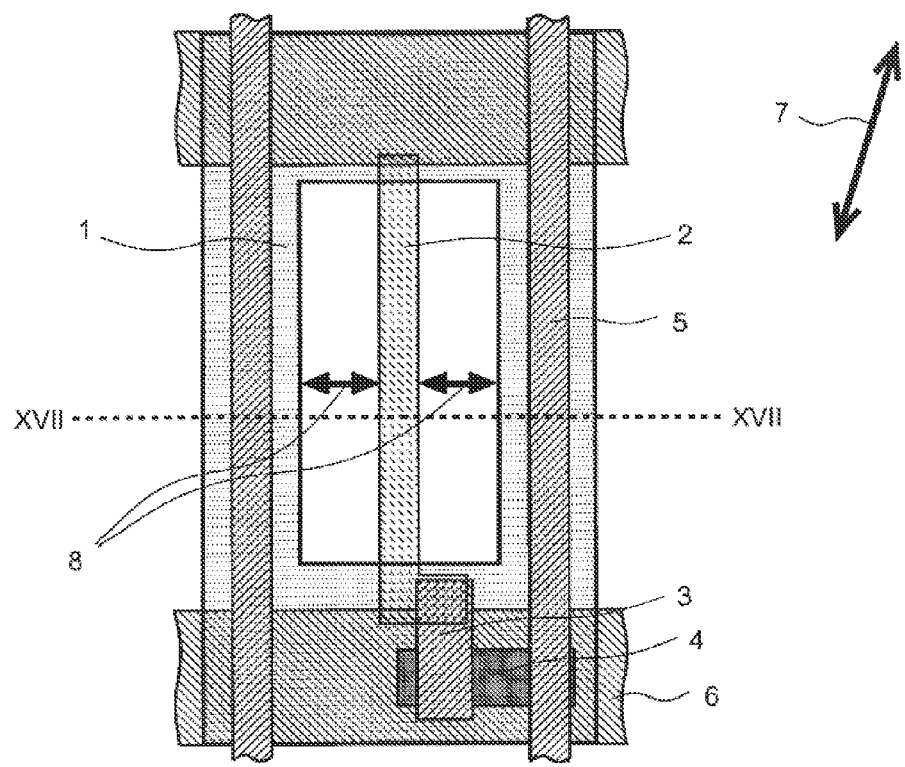
Figure 17:
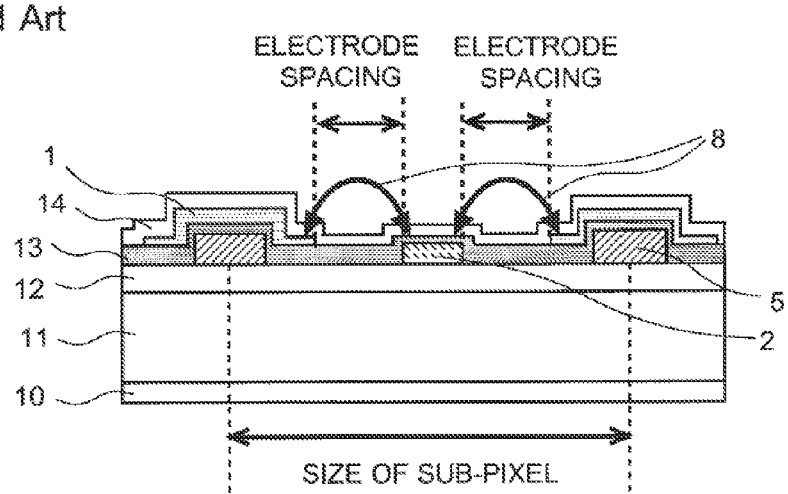
Figure 18:
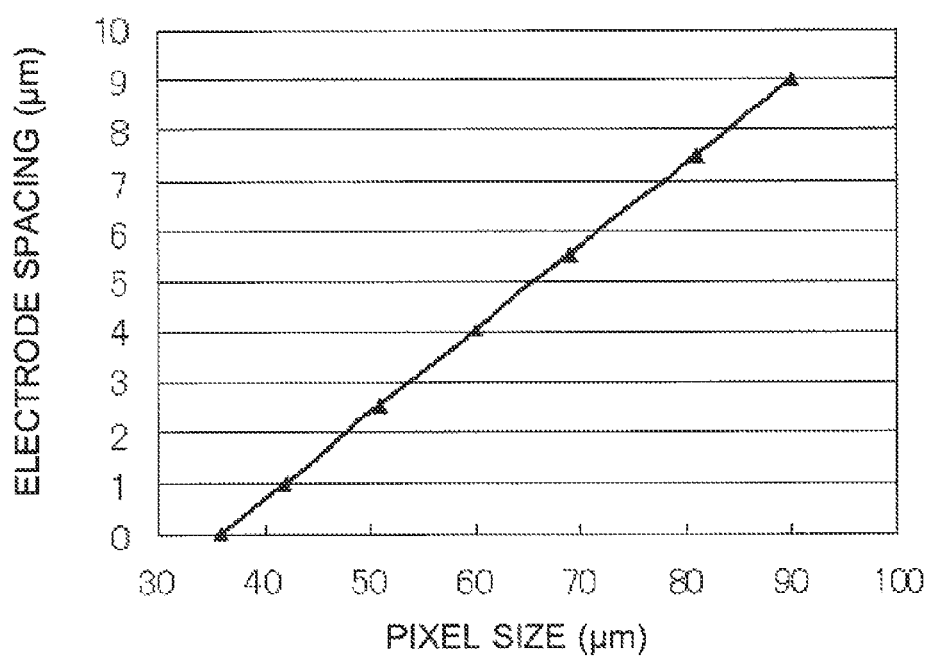
Figure 19A:
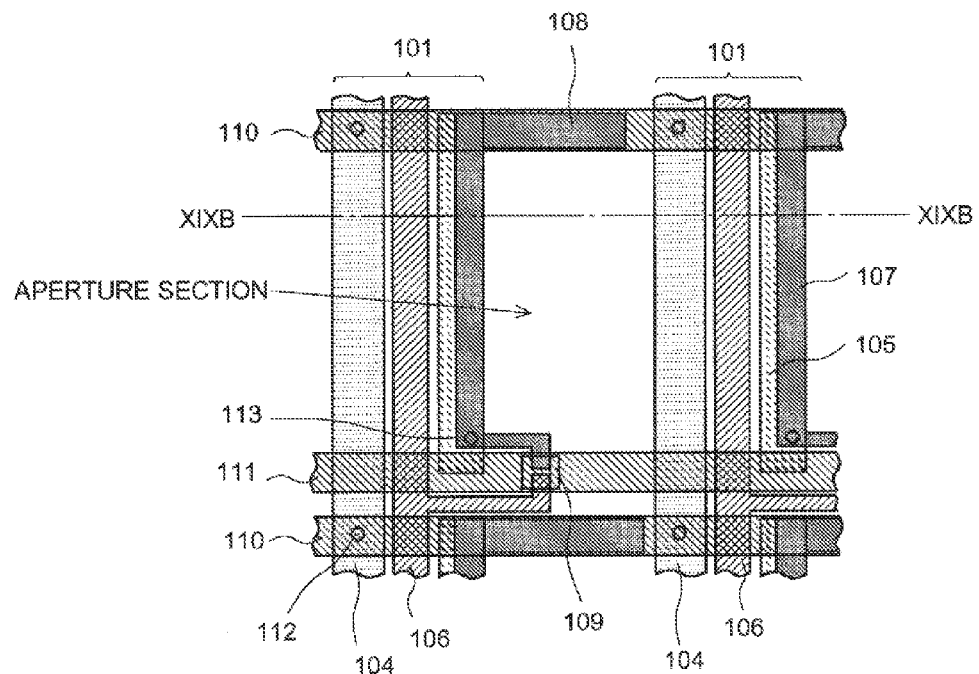
Figure 19B:
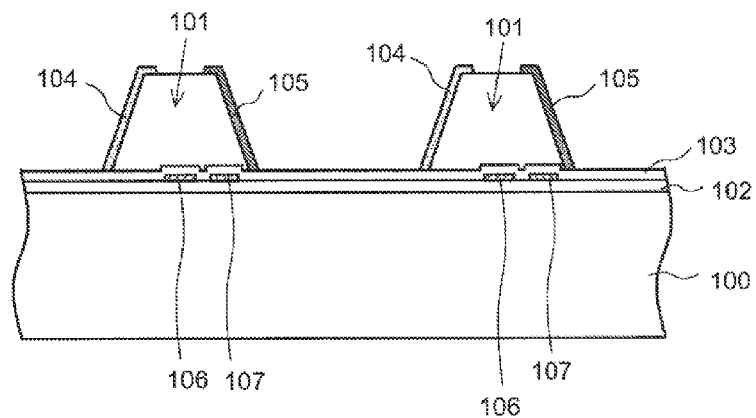
Figure 20:
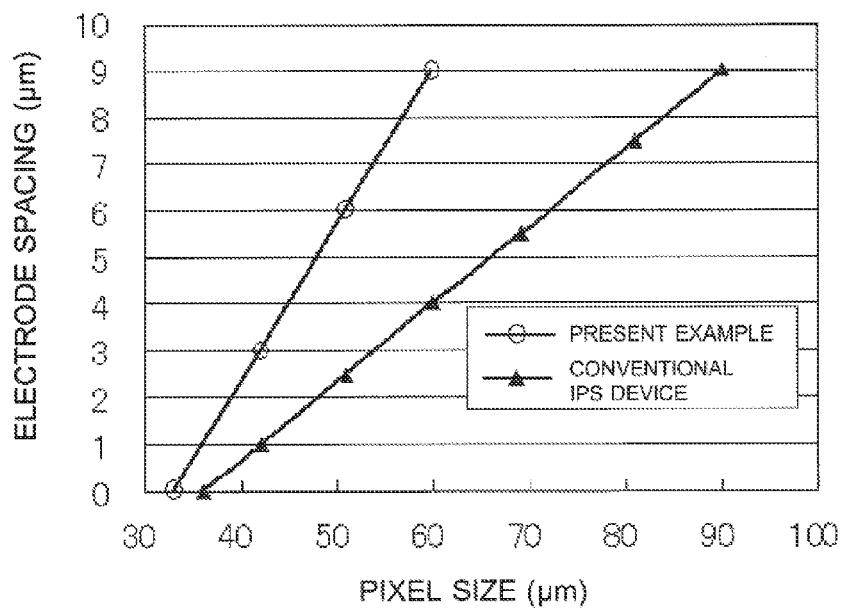
Figure 21:
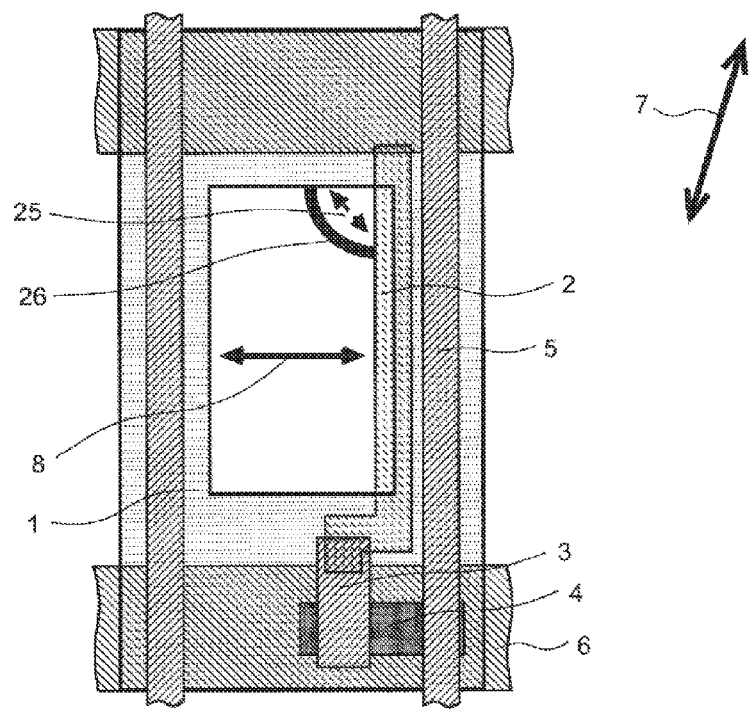
Figure 22:
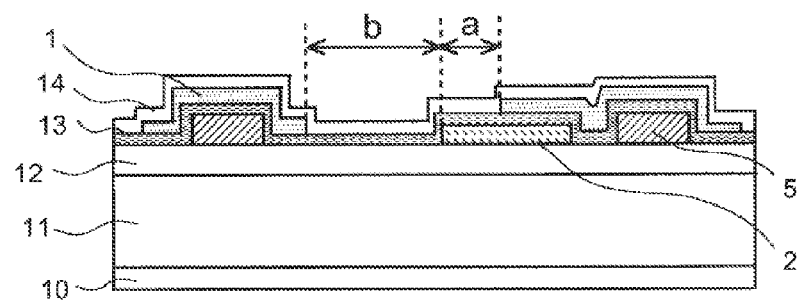
Figure 23:
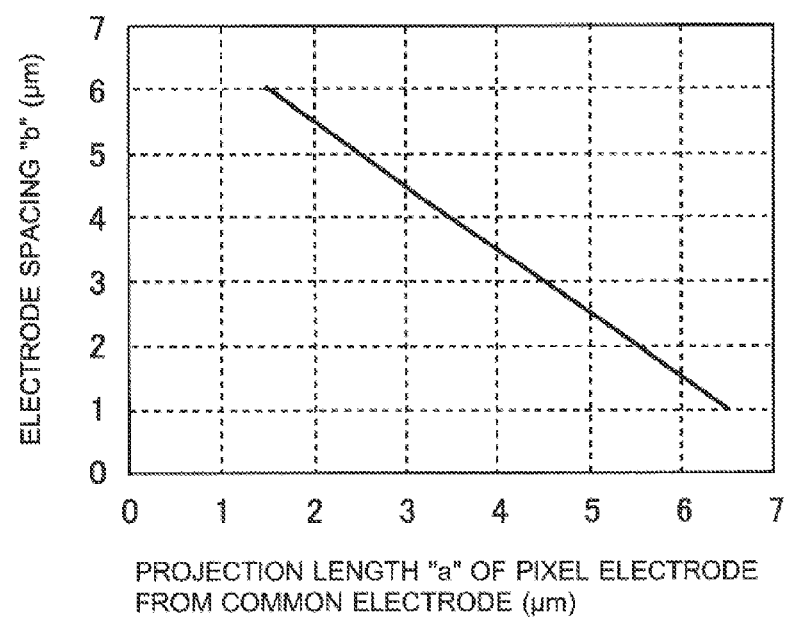
Figure 24:
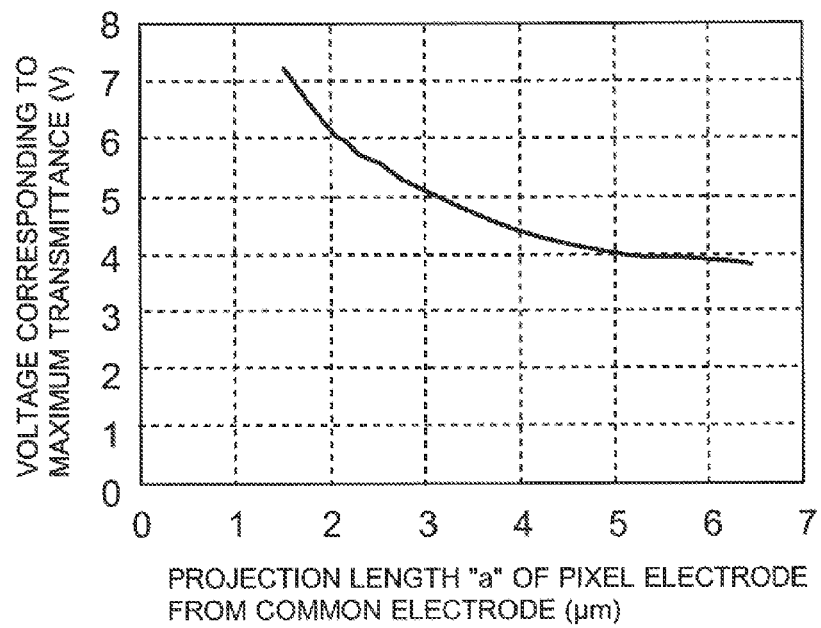
Figure 25:
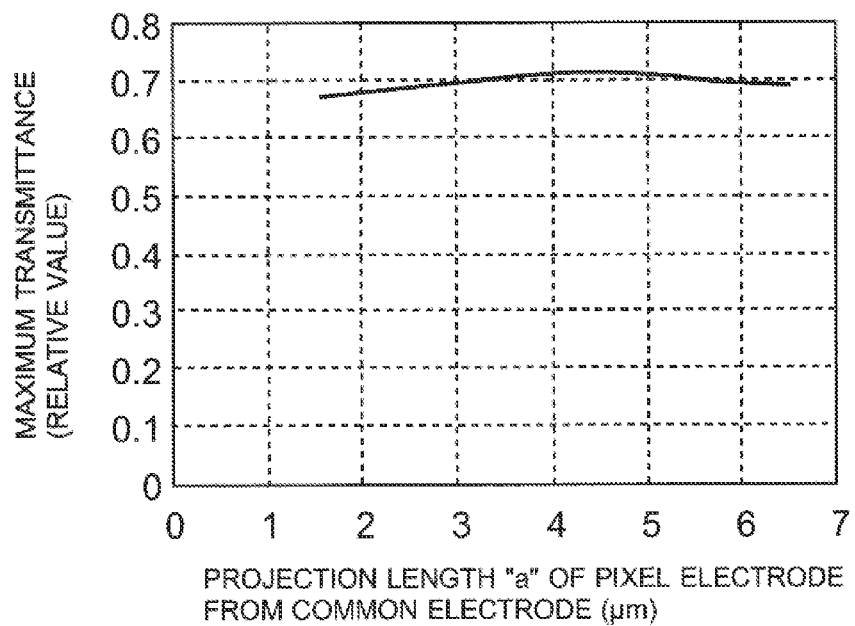
Figure 26:
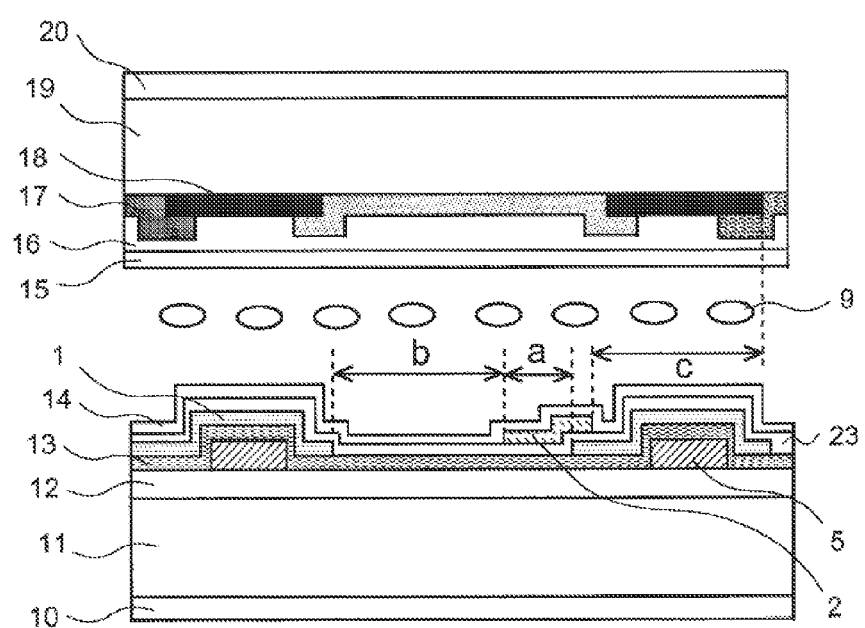

Each of FIGS. 15A to 15D is a plan view illustrating a structure of a display screen of a liquid crystal display device of Example 9;

FIG. 16 is a plan view illustrating a conventional liquid crystal display device in the IPS mode;

FIG. 17 is a sectional view taken along the line XVII-XVII in FIG. 16;

FIG. 18 is a graph illustrating a relationship of the pixel size and the electrode spacing of a conventional liquid crystal display in the IPS mode;

FIGS. 19A and 19B are a plan view and a sectional view taken along the line XIXB-XIXB, both illustrating a liquid crystal display device of the related art;

FIG. 20 is a graph illustrating a relationship of the pixel size and the electrode spacing of a conventional liquid crystal display in the IPS mode and a relationship of the pixel size and the electrode spacing of a liquid crystal display in the IPS mode of the present embodiment;

FIG. 21 is a diagram illustrating a structure of one pixel of a liquid crystal display device of Example 1, as a plan view concretely illustrating a lateral electric field to rotate liquid crystal molecules in the counter direction and an area where the lateral electric field makes a disclination;

FIG. 22 is a sectional view of one sub-pixel viewed along the direction of data lines of a liquid crystal display device of Example 10;

FIG. 23 is a graph illustrating a relationship of projection length "a" of a pixel electrode from a common electrode and electrode spacing "b" relating to Example 10;

FIG. 24 is a graph illustrating a relationship of projection length "a" of a pixel electrode from a common electrode and voltage corresponding to the maximum transmittance relating to Example 10;

FIG. 25 is a graph illustrating a relationship of projection length "a" of a pixel electrode from a common electrode and the maximum transmittance relating to Example 10; and FIG. 26 is a sectional view of one sub-pixel viewed along the direction of data lines of a liquid crystal display device of Example 11.

DETAILED DESCRIPTION

Illustrative embodiments of lateral electric field type liquid crystal display devices will be described below with reference to the drawings. It will be appreciated by those of ordinary skill in the art that the description given herein with respect to those figures is for exemplary purposes only and is not intended in any way to limit the scope of potential embodiments may be resolved by referring to the appended claims.

As described above, lateral electric field type liquid display devices in the IPS mode can cause a problem that each pixel becomes small in size and that, especially, the efficiency for light utilization deteriorates significantly because the interval between the common electrode and the pixel electrode becomes small under the condition that each pixel is 50 μm or less in size.

In view of the problem, there are provided illustrative lateral electric field type liquid crystal display devices in the IPS mode with small-sized pixels, which can provide a high aperture ratio, an excellent image quality, an excellent viewing angle characteristics and a high resolution.

One of the illustrative embodiments, which is provided as a first embodiment, is a lateral electric field type liquid crystal display device configured to perform a display control by changing a molecule orientation of homogeneous-aligned liquid crystal using an electric field almost parallel with substrates of the display device. The display device comprises: a first substrate and a second substrate facing each other; liquid crystal put between the first substrate and the second substrate; a plurality of scan lines and a plurality of data lines both arranged on the first substrate; and a plurality of pixels each of whose boundary is defined by two of the scan lines and two of the data lines. Each of the pixels includes a strip-shaped pixel electrode arranged to be closer to one of the two data lines than the other and to extend along the one of the two data lines, a common electrode including a first common electrode part covering the one of the two data lines and a second common electrode part covering the other of the two data lines, and an insulating film arranged between the pixel electrode and the common electrode with separating the pixel electrode from the common electrode. In each of the pixels, the first common electrode part and the pixel electrode overlap together to form an overlapping area, the pixel electrode includes a projecting part which projects from the overlapping area toward an inside of the each of the pixels, and a side edge of the projecting part of the pixel electrode is separated from a side edge of the second common electrode part so as to generate a lateral electric field thereamong to drive the liquid crystal.

The above structure allows increasing the interval between the side edge of the projection part of the pixel electrode which project from the common electrode and the side edge of the common electrode part formed to cover the farther one of the two data lines away from the pixel electrode to be the maximum. Further, because the pixel electrode and the common electrode overlap together, there is formed, in an area where the pixel electrode and the common electrode part face each other to generate the lateral electric field, no space between the pixel electrode and the common electrode at the farther side of the area away from the common electrode part. Therefore, this area does not cause a part which is different in a voltage-transmittance characteristic from the other part, which allows an efficient display control. Further, the overlap of the common electrode and the pixel electrode allows forming a storage capacity in the overlapping area, which results in a reduction of the area of a storage capacity formed in the other area and can provide the higher aperture ratio. Further, in this structure, the electric field emitted from the data lines is shielded by not only the common electrode part arranged on the data lines but also the pixel electrode arranged to overlap with the common electrode. Therefore, the electric field is perfectly shielded.

In this embodiment, it is preferable that the pixel electrode is formed so as to project from the common electrode by 1 μm or more in the area where the common electrode part and the pixel electrode overlap together, which allows generating an effective electric field between the pixel electrode and the opposing part of the common electrode.

FIG. 20 shows a graph illustrating the relationship of the pixel size of the above-described liquid crystal display device in the IPS mode and the electrode spacing. It is assumed that the data lines are 3 μm in width, the common electrode is 9.5 μm in width (where the projection part which projects from the data line at the side overlapping with the pixel electrode is 3.5 μm in length, the part on the data line is 3 μm in width, the projection part which projects from the data line at the opposite side to that overlapping with the pixel electrode is 3 μm in width, whose total is 9.5 μm) and the pixel electrode is 3 μm in width (where the part overlapping with the common electrode is 1.5 μm in width and the part projecting from the common electrode is 1.5 μm in width). FIG. 20 further illustrates the relationship of the pixel size and the electrode spacing under the condition that a pixel electrode is arranged at the center of each pixel to form two strips of spaces between the pixel electrode and the common electrode in the conventional device. As shown in FIG. 20, by employing the structure of the above embodiment, a sufficient space between the common electrode and the pixel electrode to generate a lateral electric field can be secured even in the display device of the IPS mode having small-sized pixels, which allows providing a lateral electric field type liquid crystal display device having the higher aperture ratio than conventional display device of the IPS mode.

The first embodiment may further include the following structure to provide a second embodiment: in the overlapping area of each of the pixels, the common electrode is arranged at a position closer to the liquid crystal than the pixel electrode.

When the common electrode is arranged at a closer position to the liquid crystal layer, the whole or a part of an insulating film put between the common electrode and the data lines can be used also for the insulating film between the pixel electrode and the common electrode, which reduces the frequency of forming insulating films and allows manufacturing the structure at low cost.

The second embodiment may further include the following structure to provide a third embodiment: each of the pixels further includes an insulating film on which the pixel electrode and the data lines are formed.

In such the structure, an insulating film can be used commonly for the insulating film between the common electrode and the data lines and the insulating film between the common electrode and the pixel electrode, which can reduce the frequency of forming insulating films to be the minimum.

The second embodiment may further include the following structure to provide a fourth embodiment: in each of the pixels, an insulating film is formed between the pixel electrode and the data lines.

When the insulating film is formed between the pixel electrode and the data lines in the second embodiment, the short circuit between the electrodes coming from the pattern deformation of the pixel electrode or the data lines can be avoided.

The first embodiment may further include the following structure to provide a fifth embodiment: in the overlapping area of each of the pixels, the pixel electrode is arranged at a position closer to the liquid crystal than the common electrode.

When the pixel electrode is arranged at a closer position to the liquid crystal layer, the electric field, which is generated between the pixel electrode and the common electrode part positioned with facing the pixel electrode at an interval, is easily applied to the liquid crystal layer, which makes an advantage that the voltage applied to the pixel electrode can be reduced.

Any one of the second to fourth embodiments may further include the following structure to provide a sixth embodiment: in each of the pixels, the projecting part of the pixel electrode and the second common electrode part satisfy $b/a \leq 3$, where a is a projection length of the projecting part from the overlapping area, and b is an interval between the side edge of the projecting part and the side edge of the second common electrode part.

In the structure satisfying this relationship, the lateral electric field is effectively applied to liquid crystal molecules, which realizes the higher transmittance.

The fifth embodiment may further include the following structure to provide a seventh embodiment: the liquid crystal display device further includes a black matrix formed on the second substrate to have a lattice shape along the scan lines and the data lines, wherein, in each of the pixels, the black matrix and the pixel electrode satisfy $c \geq 6$ μm, where c is an interval between a side edge of the pixel electrode in the overlapping area and a farther side edge of a part of the black matrix away from the pixel electrode, the part of the black matrix extending along one of the data lines and being arranged at a boundary between the each of the pixel and a neighboring pixel placed closest to the pixel electrode.

In the structure satisfying this relationship, the electric field generated in the pixel does not enter the aperture section of the neighboring pixel, which does not affect the image quality, generates an electric field effectively applied to the liquid crystal molecules, and achieves the higher transmittance.

Any one of the first to seventh embodiments may further include the following structure to provide an eighth embodiment: in each of the pixels, the data lines, the common electrode and the pixel electrode are bent into a symmetric shape including two symmetric parts facing each other in a direction of an initial alignment of the liquid crystal.

This structure makes two rotation directions of liquid crystal molecules under the voltage applied between the pixel electrode and the common electrode, which enhances the viewing angle in an excellent condition.

Any one of the first to eighth embodiments may further include the following structure to provide a ninth embodiment: in each of the pixels, the pixel electrode and the common electrode are arranged such that a first rotation direction of the liquid crystal is same as a second rotation direction of the liquid crystal, where the first rotation direction is a rotation direction of the liquid crystal in an edge part of a space between the pixel electrode and the common electrode to generate a lateral electric field, and the second rotation direction is a rotation direction of the liquid crystal, in an area around the edge part, rotated by a lateral electric field generated between the side edge of the projecting part of the pixel electrode and the side edge of the second common electrode part.

This structure provides the stable alignment of the liquid crystal molecules in the area (a column) between the pixel electrode and the common electrode to form the lateral electric field, which enhances the efficiency of light utilization at the edge of the column and enhances properties such as brightness and contrast of the display device. Further, this structure also provides the stable displaying condition even under a pressure applied to the display screen, for example, by a finger.

Any one of the first to ninth embodiments may further include the following structure to provide a tenth embodiment: the plurality of pixels are a plurality of first pixels and a plurality of second pixels, where the first pixels are the pixels in each of which the pixel electrode overlaps with a part of the common electrode arranged at a right side of the each of the first pixels, and the second pixels are the pixels in each of which the pixel electrode overlaps with a part of the common electrode arranged at a left side of the each of the second pixels.

Though an example will be described later, the structure of pixels of the first to ninth embodiments has viewing angle characteristics which are asymmetric at the left side and the right side of one pixel. By arranging two types of pixels on the display device as shown in the tenth embodiment, the two types of pixels compensate the viewing angle characteristics at the left and right sides each other, which enhances the viewing angle characteristics in a more excellent condition.

The tenth embodiment may further include the following structure to provide a eleventh embodiment: the plurality of pixels are groups of pixels working as sub-pixels composing one of the first pixels and the second pixels, and in each of the pixels in one group, the pixel electrode overlaps with a part of the common electrode arranged at a same side of the each of the pixels.

When there are arranged pixels such that the pixel electrode overlaps with a part of the common electrode arranged at a same side of the each of the pixels, in a group of pixels working as sub-pixels composing one pixel, the following effect can be obtained. For example, when each of the first pixel and the second pixel includes sub-pixels corresponding to R, G, B colors in the above embodiment, the viewing angle characteristics at the right and left sides are different from each other for each of R, G, B colors of sub-pixels. Such the structure does not cause a malfunction such as unwanted coloration at an oblique viewing angle.

By employing the above embodiments, an excellent-definition liquid crystal display device in the IPS mode with a high image quality and high aperture ratio can be provided.

EXAMPLES

As shown in the above descriptions about the background, many of conventional liquid crystal display devices in the IPS mode generally employ a structure wherein a pixel electrode is arranged so as to form a uniform interval between the pixel electrode and each of parts of the common electrode at the opposing sides of a sub-pixel. However, in the device with small-sized pixels, it is hard to secure the sufficient electrode spacing with respect to the width of the electrodes, which makes the efficiency of light utilization deteriorate significantly. In view of the problem. JP-A No. 2006-267317 discloses a structure that a set of an electrode pixel and a common electrode part is arranged at each of the opposing sides of one pixel to enlarge the electrode spacing. In the structure, there is no electrode which covers a space right above each data line. Therefore, in order to prevent a leak of electric field coming from the each data line, it is required to enlarge the interval between the common electrode part and the pixel electrode, which does not actually allow a large aperture ratio. Further, because this structure includes protrusions, a treatment, such as a rubbing treatment, to define the initial alignment of liquid crystal molecules is hardly performed in the aperture section where no protrusions are arranged, which results in a deterioration of the image quality.

Therefore, one of the embodiments of the present invention provides the following structure. A lateral electric field type liquid crystal display of the IPS mode includes plural pixels, wherein two scan lines and two data lines form a boundary of each of the pixels. In each pixel, a strip-shaped pixel electrode is arranged so as to be close to one of the two data lines and extend along the one of the two data lines. Further, common electrode parts covering the data lines are formed in a layer which is separately provided from the pixel electrode. A part of the common electrode covering one of the data lines and the pixel electrode overlap together to form an overlapping area, and the pixel electrode includes a projection part which projects from the overlapping part toward the inside of its pixel. The side edge of the projection part of the pixel electrode is separated from a side edge of a part of the common electrode covering the other of data lines to generate a lateral electric field between those side edges. The lateral electric field drives liquid crystal of the display device.

Example 1

Figure 1:
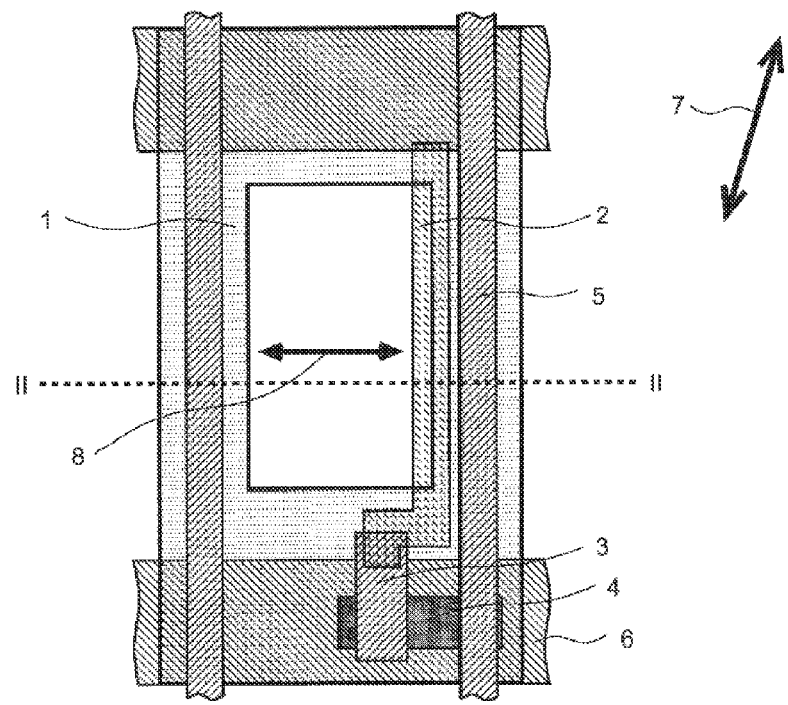
FIG. 1 is a plan view illustrating a structure of one pixel of a liquid crystal display device of Example 1.
Figure 2:
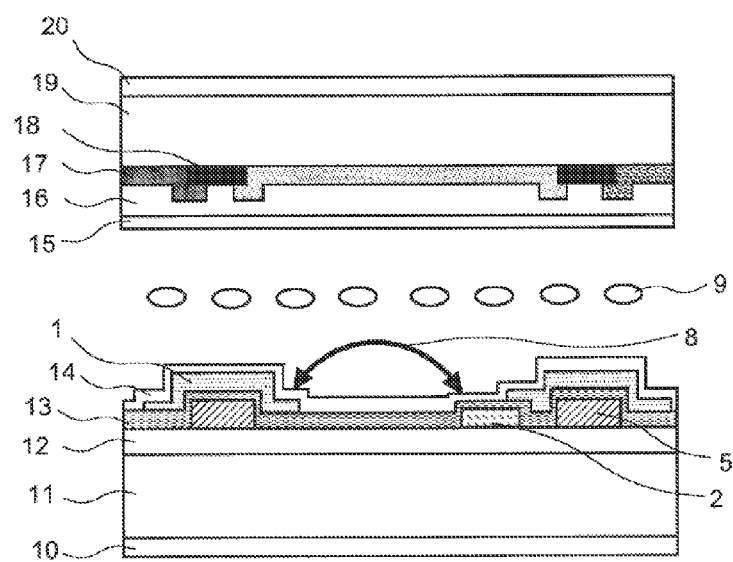
FIG. 2 is a sectional view taken along the line II-II in FIG. 1, which illustrates a structure of the liquid crystal display device of Example 1.

A lateral electrode field type liquid crystal display device of Example 1 will be described below with referring to FIGS. 1 and 2, to illustrate the above-described embodiments further more in detail. FIG. 1 is a plan view illustrating the structure of one pixel of a liquid crystal display device of Example 1. FIG. 2 is a sectional view taken along the line II-II in FIG. 1, which illustrates a structure of the liquid crystal display device of Example 1. Detailed descriptions of Example 1 shown in FIGS. 1 and 2 will be provided below.

First, an example of manufacturing processes of the liquid crystal display device of Example 1 will be described in detail with reference to FIGS. 1 and 2. However, the following descriptions about materials, thickness, and the order of layers of the device are for illustrative purpose only, and it is to be understood that changes and variations may be made without departing from the spirit or scope of the appended claims.

To form a substrate at the side of TFT (Thin Film Transistor), there is prepared a glass substrate as first transparent insulating substrate 11, and a first metal layer made of molybdenum-based alloy is layered on the glass substrate to have the thickness of 300 nm by spattering processing. The layer is patterned into scan lines 6.

Next, silicon oxide is layered on the given workpiece by 100 nm to form gate insulating film 12. Successively, silicon nitride of 300 nm thickness and i-a-Si (intrinsic amorphous Silicon) of 170 nm thickness, and n-a-Si (n-type amorphous Silicon) of 30 nm thickness are layered by using the PCVD (Plasma Chemical Vapor Deposition). The layered films of i-a-Si and n-a-Si are partially removed by an etching treatment with a portion to be thin-film semiconductor layer 4 being left.

Next, a transparent conducting film made of ITO (Indium Tin Oxide) is layered on the workpiece, to form pixel electrode 2 having a striped shape and the thickness of 40 nm so as to extend in the direction perpendicular to the extension of scan lines 6 and be positioned close to one side of an area as an aperture section inside a pixel.

On the workpiece, a film made of molybdenum-based alloy is formed as a second metal layer, and the film is patterned into data lines 5 and source electrode 3. Data lines 5 are arranged so as not to overlap with pixel electrode 2 and to be parallel with the pixel electrode 2. Source electrode 3 is arranged so as to have an area partially overlapping with pixel electrode 2 and to be electrically connected to the pixel electrode 2. In this example, the TFT is composed of a part of scan line 6, gate insulating film 12, thin-film semiconductor layer 4, a part of data line 5, and source electrode 3. The pixel electrode 2 is arranged with being close to and extending along one of the data line 5. The interval between the pixel electrode 2 and the data line 5 is assumed to be 2 µm in this example.

Next, by using the second metal layer as a mask, an unnecessary part of the n-a-Si layer of thin-film semiconductor layer 4 of the TFT is removed through a etching treatment.

Next, on the workpiece, silicon oxide of the thickness of 500 nm is layered as passivation film 13.

On the layer, a part of gate insulating film 12 and a part of passivation film 13 are removed through an etching treatment in order to expose the metal layer at terminal sections of scan lines 6 and data lines 5 which have been taken out around the display screen.

Further, there is formed a transparent conducting film made of a material such as ITO (Indium Tin Oxide) to provide common electrode 1 of the thickness 80 nm so as to cover scan lines 6 and data lines 5 and to cover a part of pixel electrode 2. Common electrode is electrically connected to common electrode lines which are formed of the first meal layer and the second metal layer around the display screen through contact holes, thought the detailed illustration is omitted in the drawings. Further, common electrode 1 may be patterned so as not to be arranged at an area right above a channel section of the TFT.

Pixel electrode 2 formed with extending along data line 5, and a part of common electrode 1 formed with covering data line 5 are arranged to form an overlapping area where those electrodes overlap together. The pixel electrode 2 has a projecting area which projects toward the inside of the pixel. The width of the overlapping area is set to be 1.5 µm, and pixel electrode 2 is arranged to project by 1.5 µm toward the inside of the pixel.

On the substrate at the TFT side prepared by the above operations, oriented film 14 is applied and is baked. On the other hand, as for the counter substrate, there are formed black matrix 18, color layer 17 to be a color filter, over coating film 16 and a pillar-shaped spacer (which is not illustrated in the drawings) on second transparent insulating substrate 19. On the workpiece, oriented layer 15 is applied and is baked.

Then, a rubbing treatment is processed in the direction inclining by 15 degrees from the perpendicular direction to the extension of scan lines 6, to define the alignment direction of liquid crystal 7. Successively, both of the substrates are joined together with their peripheries fixed with sealing material to be sealed with liquid crystal 9 being put therein. Those components are arranged so as to set the liquid cell gap to be 3.0 µm, and liquid crystal 9 has refractive-index anisotropy of $\Delta n = 0.10$, and conductivity anisotropy of $\Delta \epsilon = 10$. Putting liquid crystal 9 into the cell is performed with taking a sufficient pouring period of time, so that the cell is sufficiently filled with the liquid crystal. Further, the sealing process is performed with pressurization so that the prescribed pressure is applied to the inside of the liquid crystal cell.

Onto the substrate at the TFT side of the liquid crystal panel which has been produced by the above-described operations, light-incident-side polarization plate 10 is jointed, where the polarization axis of the polarization plate agrees with the alignment direction of liquid crystal 7 to be the rubbing direction of liquid crystal 9. Onto the counter substrate, light-outgoing-side polarization plate 20 is joined so as to be in a cross Nicol state. Further, a necessary driver is mounted at the periphery, and a backlight device and a signal processing circuit are assembled to be a predetermined configuration, to produce an active-matrix addressing liquid crystal display device.

In Example 1, there is provided a liquid crystal display in the IPS (In-Plane Switching) mode wherein liquid crystal has been provided to have a homogeneous alignment in the rubbing direction. The display device is configured to control the amount of light transmittance per each pixel by changing the liquid crystal to have a twist alignment in the plane by using lateral electric field 8. The lateral electric field 8 is almost parallel with the substrates of the display device and is generated between the edge of pixel electrode arranged close to and extending along one of data lines 5 and the edge of a part of common electrode 1 arranged so as to cover the farther data line 5 from the pixel electrode. Hereinafter, the space between pixel electrode 2 and common electrode 1 for generating the lateral electric field is called as a column.

In Example 1, the liquid crystal display employed the XGA (Extended Graphics Array) with the resolution which is 1024×RGB in the horizontal direction and is 768 in the vertical direction. In this structure, the pixel size was set to 42 μm; the data line width was set to 3 μm; the width of the common electrode part on a data line was set to 9.5 μm; the projection length of the common electrode part, which is placed opposite from the common electrode part overlapping with the pixel electrode, from the data line was set to 3.5 μm; the projection length of the common electrode part, which overlaps with the pixel electrode, from the data line was set to 3.5 μm; the pixel electrode width was set to 3 μm, the width of the area where the pixel electrode and the common electrode overlap together was set to 1.5 μm, and the projection length of the pixel electrode from the common electrode was set to 1.5 μm. In this case, the space between the pixel electrode and the common electrode comes to 3 μm in length. In the conventional IPS structure having similar-sized pixels as the present example, assuming that the projecting length of the common electrode part from the pixel electrode is 3 μm, the space between the common electrode and the pixel electrode comes to 1 μm, that is, the total of spaces in one pixel is as small as 2 μm. Accordingly, the structure of the present example can provide the increased aperture ratio by 50% in comparison with that of the conventional IPS structure.

FIG. 20 is a graph illustrating the relationship of the pixel sizes in the range from 33 μm to 90 μm, and the electrode spacing regarding the structure of the present example and the conventional structure, based on those conditions. As can be seen from the graph, the structure of the present example (open circles in FIG. 20) can secure the electrode spacing wider than the conventional IPS structure (filled triangles in FIG. 20) having similar-sized pixels as the present example, which enables the higher aperture ratio.

The above-described setting values are those employed in Example 1, but should be properly set without limited to those values. However, in the area where the pixel electrode and the common electrode part overlap together, the pixel electrode is preferably arranged so as to project by more than 1 μm outside from the common electrode, which allows generating an effective lateral electric field between the pixel electrode and the common electrode part at the opposite side.

In Example 1, the material of the metal films is molybdenum-based alloy. However, the material is not limited to the molybdenum-based alloy and it may be aluminum-based alloy. Further, Example 1 employs the following manufacturing processes performed in this order: forming thin-film semiconductor layer 4, forming pixel electrodes 2 out of a transparent conductor film, forming source electrode 3 and data lines 5, and removing an unnecessary part of n-a-Si layer of thin-film semiconductor layer 4 through an etching treatment. However, the manufacturing processes are not limited to those, and for example, the following processes may be performed in this order: forming thin-film semiconductor layer 4, forming source electrode 3 and data lines 5, removing an unnecessary part of the n-a-Si layer of thin-film semiconductor layer 4; and forming pixel electrodes 2 out of a transparent conductor film. Forming pixel electrode 2 and common electrode 1 out of transparent conductor films such as ITO enhances the transmittance of the liquid crystal display panel.

As described above, employing the above-described structure allows a wide electrode spacing though the pixel size is small, which makes the aperture ratio large. Further, since the pixel electrode and the common electrode part overlap together, there is formed, in an area where the pixel electrode and the common electrode part face each other to generate the lateral electric field, no space between the pixel electrode and the common electrode at the opposite side of the area from the common electrode part. Therefore, a region in which voltage-transmittance characteristics are different from other areas does not occur in this area, which allows an efficient display control.

Further, when the common electrode part and the pixel electrode overlap together, the storage capacity can be formed in this overlapping area, which reduces the area of the storage capacity in other areas and makes the aperture ratio higher. Further, it means that the electric field coming from a data line is shielded by not only the common electrode part arranged on the data line but also the pixel electrode arranged so as to overlap with the common electrode part, which makes the shielding of the electric field more close to the perfect condition.

Further, when the common electrode is arranged at the position closer to the liquid crystal layer, the whole of or a part of the insulating film between the common electrode and the data lines can be used also as the insulating film arranged between the pixel electrode and the common electrode, which reduces the number of operations to form insulating films and allows the device to be manufactured at low cost. Further, it allows a common insulating film working as the insulating film between the common electrode and the data lines and the insulating film between the common electrode and the pixel electrode, which reduces the number of operations to form the insulating films much less than the other cases.

Other examples which can solve additional problems and can exhibit additional effects will be described later.

Example 2

Figure 3:
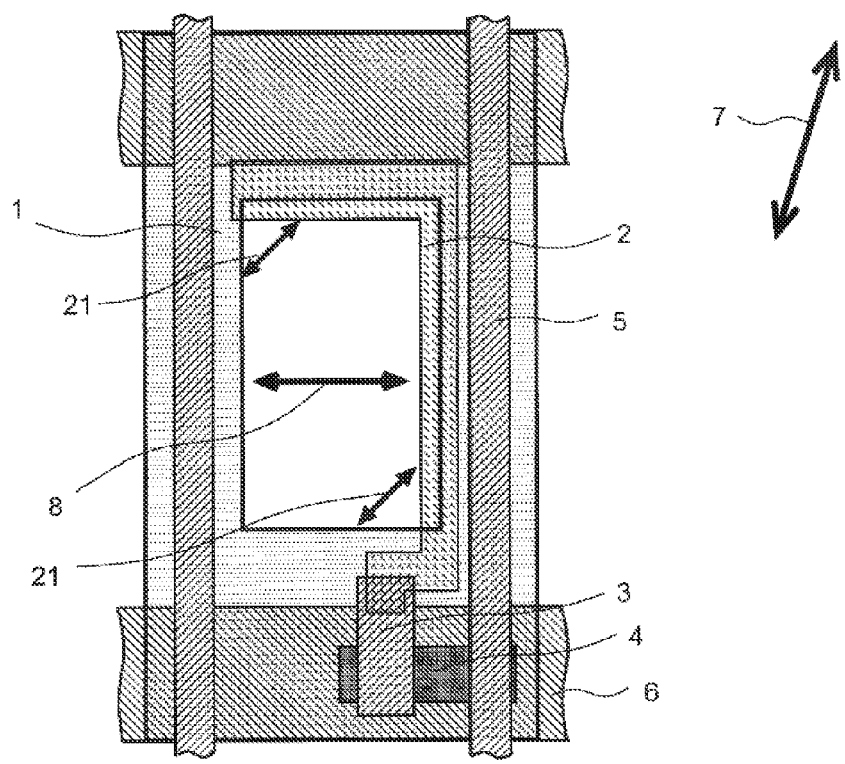
FIG. 3 is a plan view illustrating a structure of one pixel of a liquid crystal display device of Example 2.

Next, a lateral electric field type liquid crystal display device relating to Example 2 will be described with referring to FIG. 3. FIG. 3 is a plan view illustrating one pixel of the liquid crystal display device relating to Example 2. Example 2 shown in FIG. 3 will be described in detail bellow.

In Example 1, under the condition that the direction of liquid crystal arrangement 7 is set as shown in FIG. 21, the rotation direction of the liquid crystal caused by lateral electric field 25 generated at the edge area of the column between pixel electrode 2 and common electrode 1 becomes the opposite direction from the rotation direction of the liquid crystal caused by the lateral electric field 8 generated by an area where the pixel electrode and the common electrode part are arranged with extending in parallel with each other. Such the structure can cause disclination generation area 26 in a pixel as shown in FIG. 21. It is an additional problem but is more preferable not to cause the disclination generation area, because it can avoid a deterioration of the transmittance and contrast and a generation of an unevenness of the display screen made under the situation that external pressure applied to the display screen, for example, by a finger leaves a mark on the screen, which can be a factor to make the image quality of the display device significantly deteriorate.

In view of the above, Example 2 provides the structure that, under the condition that alignment direction of liquid crystal 7 is set as shown in FIG. 3, pixel electrode 2 is arranged with extending also along the upper side of the aperture area in the pixel, so as to project from common electrode 1. This structure does not cause lateral electric field 21 generated in the area the common electrode and the pixel electrode are arranged close to each other so as to rotate the liquid crystal in the counter direction, which less generate the disclination. It allows an enhancement of the light-utilization efficiency at the edge part of the column, which enhances the brightness and the contrast of the display device and makes the display condition stable regardless the pressurization to the display screen, for example, by a finger, which is more preferable.

Example 3

Figure 4:
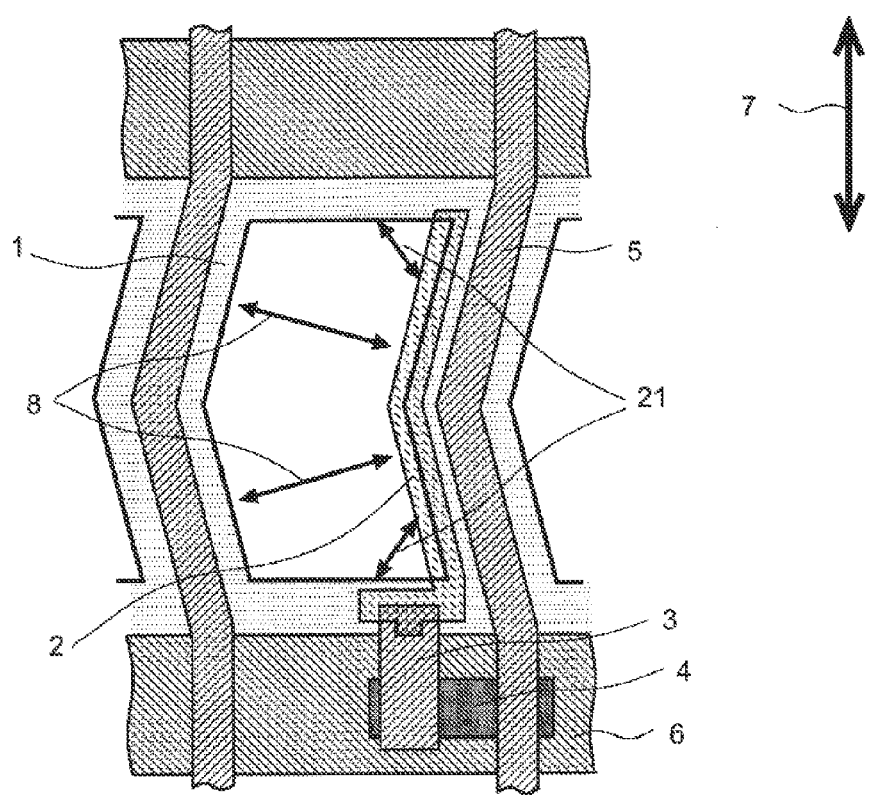
FIG. 4 is a plan view illustrating a structure of one pixel of a liquid crystal display device of Example 3.

A lateral electric field type liquid crystal display device relating to Example 3 will be described with reference to FIG. 4. FIG. 4 is a plan view illustrating the structure of one pixel of the liquid crystal display device relating to Example 3. Example 3 shown in FIG. 4 will be described below in detail.

In Example 1, when the viewing angle is inclined from the normal direction to the display screen under the condition that the liquid crystal is subjected to the electric field to be rotated, conditions of the retardation of the liquid crystal (Δn×liquid crystal cell gap) differ among the following situations: one of the situations is that the viewing angle is inclined toward the direction of the minor axis of the liquid crystal and the other is that the viewing angle is inclined toward the direction of the major axis of the liquid crystal. When the viewing angle is inclined toward the direction of the minor axis, the apparent refractive-index anisotropy does not change and the retardation increases because of an increase of the optical path length of light which travels across the liquid crystal cell, which results in a yellowish appearance of the liquid crystal. On the other hand, when the viewing angle is inclined toward the direction of the major axis, the apparent refractive-index anisotropy decreases and the retardation decreases while the optical path length increases, which results in a bluish appearance of the liquid crystal. Accordingly, the coloration of the liquid crystal changes depending on the viewing angle, which is an additional problem but is preferably avoided.

In view of this matter, Example 3 provides the structure wherein data lines 5, parts of common electrode 1 arranged with covering the data lines and strip-shaped pixel electrode 2 arranged along one of the data lines are bent to be a symmetric shape including two symmetric parts facing each other in the direction of alignment (initial alignment) of the liquid crystal 7. Thereby, two areas divided on the line where the pixel and its components are bent provide opposite rotation directions of the liquid crystal, which are symmetric areas facing each other in the direction of liquid crystal alignment 7. By using the liquid crystal in the two areas, the optical properties in the major axis and the minor axis directions obtained when the viewing angle is inclined, are compensate to each other, and the coloration of the liquid crystal can be reduced, which is preferable.

As shown in FIG. 4, liquid crystal in the upper half of the pixel rotates in the counter clock direction, and liquid crystal in the lower half of the pixel rotates in the clock direction. The various electrodes are arranged in this example so as to define the direction of lateral electric field 21 at the edge part of the column such that liquid crystal rotates in the direction which agrees with the proper direction of the liquid crystal to be rotated at every position in the pixel. This arrangement can reduce the occurrence of disclination and can enhance the light-utilization efficiency and other properties of the display device such as the brightness and contrast. Further, it makes the display condition stable regardless the pressurization to the display screen, for example, by a finger.

Example 4

Figure 5:
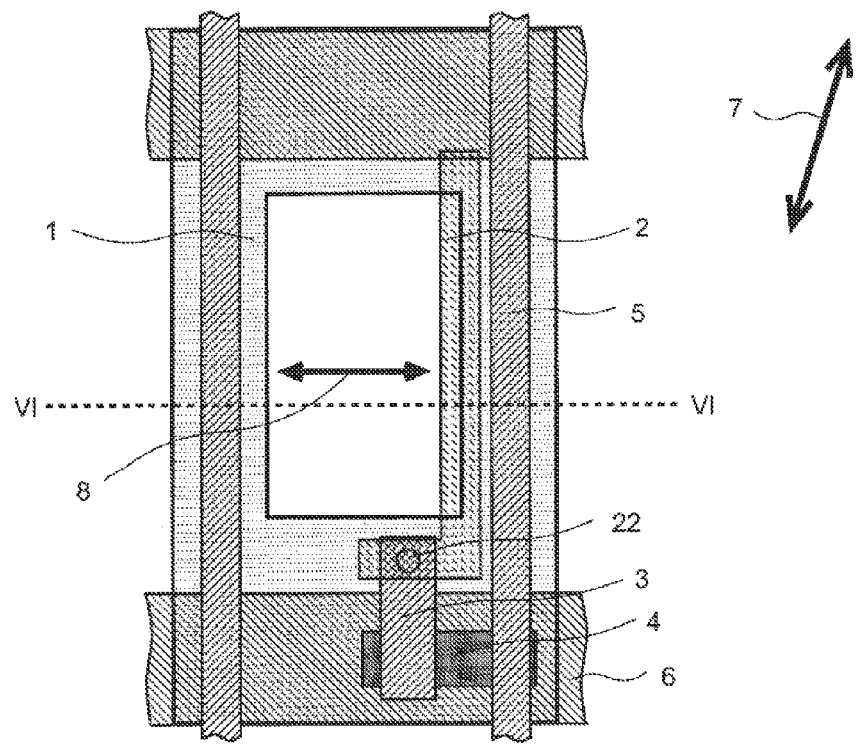
FIG. 5 is a plan view illustrating a structure of one pixel of a liquid crystal display device of Example 4.
Figure 6:
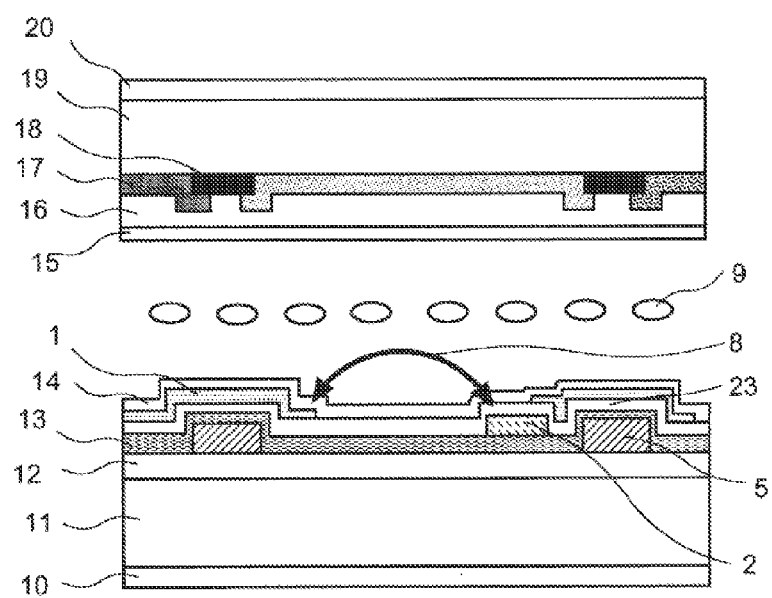
FIG. 6 is a sectional view taken along the line VI-VI in FIG. 5, which illustrates a structure of the liquid crystal display device of Example 4.

A lateral electric field type liquid crystal display device relating to Example 4 will be described with reference to FIGS. 5 and 6. FIG. 5 is a plan view illustrating the structure of one pixel of the liquid crystal display device relating to Example 4. FIG. 6 is a sectional view taken along the VI-VI line of FIG. 5. Example 4 shown in FIGS. 5 and 6 will be described below in detail.

In Example 1, pixel electrode 2, source electrode 3, data lines 5 are formed on gate insulating film 12 together. It is required to decrease the distance between the data line 5 and pixel electrode 2 as possible in order to increase the aperture ratio. On the other hand, the decrease of the distance can cause a short circuit. If data line 5 and pixel electrode 2 make a short circuit, the corresponding pixel is always driven unintentionally, the quality of display image can be deteriorate, which is an additional problem but is preferably avoided.

In view of this matter, Example 4 provides the structure that pixel electrode 2 is arranged below common electrode 1, and source electrode 3 and data lines 5 are formed with transparent insulating film 23 put between them. Further, Example 4 provides contact hole 22 on passivation film 13 in order to electrically connect pixel electrode 2 and source electrode 3 together, which increases the aperture ratio by decreasing the distance between pixel electrode 2 and data line 5, and controls the deterioration of the display image quality coming from the short circuit.

As for a manufacturing method of the structure, the steps of forming thin-film semiconductor later 4 and before shown in Example 1 are the same as those of the present example. After that, in this example, source electrode 3 and data lines 5 are formed by layering molybdenum-based alloy by the thickness of 300 nm, an etching treatment is performed on a unnecessary area of n-a-Si layer of thin-film semiconductor layer 4, and then, silicon nitride with the thickness of 300 nm are layered on the resulting structure to form passivation film 13. Next, contact hole 22 is formed and pixel electrode 2 is formed out of transparent conductor film. On the structure, silicon nitride of the thickness of 300 nm is layered to form transparent insulating film 23.

Next, in order to expose the metal layer at the terminal sections of the scan lines 6 and data lines 5 which have been taken out to the position around the display screen, the predetermined areas of gate insulating film 12 and passivation film 13 are removed through an etching treatment.

On the structure, common electrode 1 with the thickness of 80 nm is patterned out of transparent conductor film made of a material such as ITO (Indium Tin Oxide) so as to cover scan lines 6 and data lines 5, and to partially cover pixel electrode 2. Common electrode 1 is electrically connected to the common electrode lines formed out of a first metal layer and a second metal layer at the position around the display screen through the contact holes, which is omitted in the drawings.

Example 5

Figure 7:
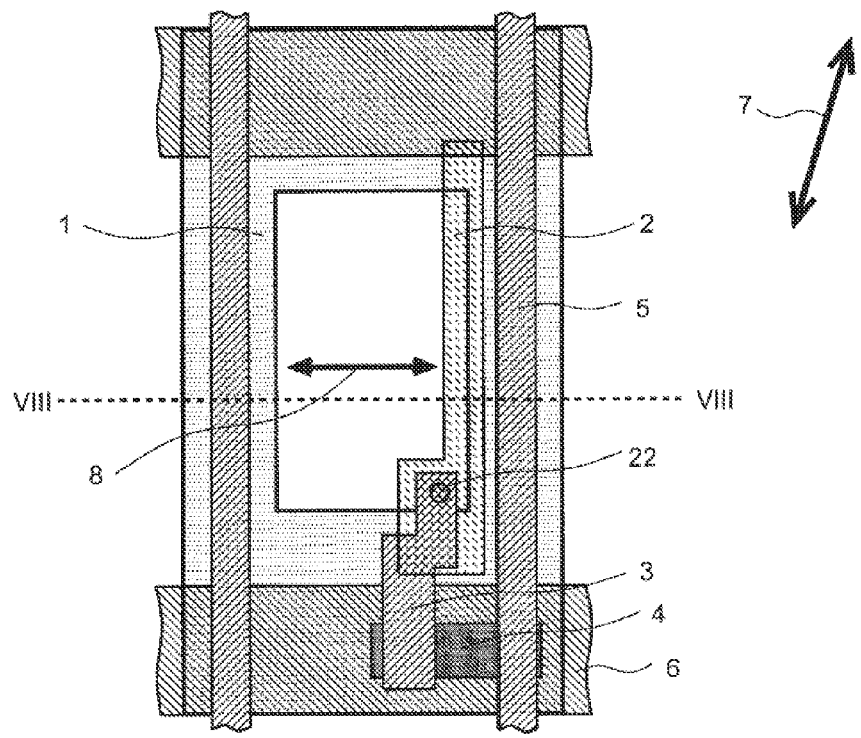
FIG. 7 is a plan view illustrating a structure of one pixel of a liquid crystal display device of Example 5.
Figure 8:
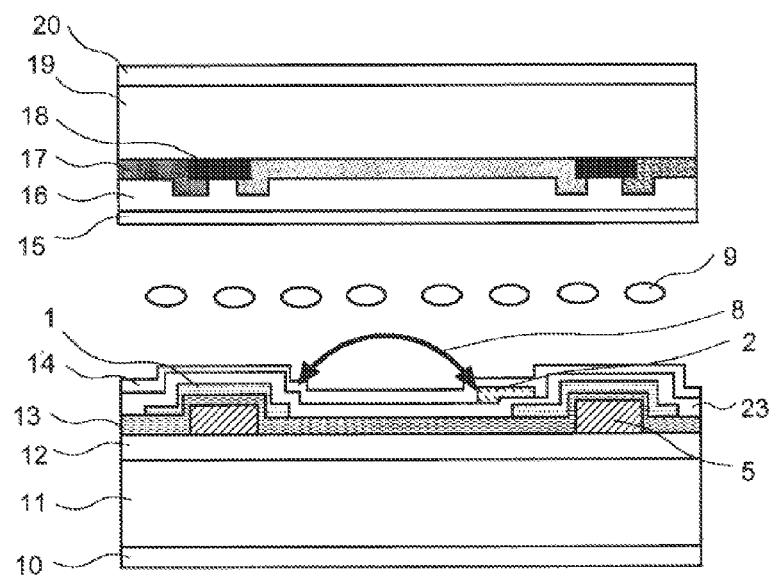
FIG. 8 is a sectional view taken along the line VIII-VIII in FIG. 7, which illustrates a structure of the liquid crystal display device of Example 5.

A lateral electric field type liquid crystal display device relating to Example 5 will be described with reference to FIGS. 7 and 8. FIG. 7 is a plan view illustrating the structure of one pixel of the liquid crystal display device relating to Example 5. FIG. 8 is a sectional view taken along VIII-VIII line of FIG. 7. Example 5 shown in FIGS. 7 and 8 will be described below in detail.

In order to avoid a short circuit made by pixel electrode 2 and data line 5, which can be caused in the structure of Example 1, pixel electrode 2 is arranged above common electrode 1, and transparent insulating film 23 is formed on common electrode 1 in Example 5. Further, contact holes 22 are formed in passivation film 13 and transparent insulating film 23 to electrically connect pixel electrode 2 and source electrode 3. This structure increases the aperture ratio by reducing the interval between pixel electrode 2 and data lines 5 and control the deterioration of display image quality coming from the short circuit.

Further, by arranging pixel electrode 2 above common electrode 1, the electric field generated between pixel electrode 2 and a part of common electrode 1 arranged to be separated from the pixel electrode for applying a lateral electric field to the liquid crystal layer, can be applied to liquid crystal 9 easily, which reduces the voltage applied between pixel electrode and the part of common electrode 1 and further reduces the projection part of pixel electrode 2 in size, where the projection part is a part of the pixel electrode which project from the part of common electrode 1 which overlap with the pixel electrode. In this example, the projection length was set to 0.5 µm. Other values such as electrode widths were set according to those of Example 1.

As for a manufacturing method of the structure, the steps of layering silicon nitride thin-film semiconductor later 4 to form passivation film 13 and before shown in Example 4 are the same as the manufacturing processes of the present example. After that, in this example, common electrode 1 of the thickness 80 nm is patterned so as to cover scan lines 6 and data lines 5.

On the structure, transparent insulating film 23 is formed out of silicon nitride film of the thickness 300 nm, and then, contact holes 22 are formed in each of passivation film 13 and transparent insulating film 23 at a position above source electrode 3, and at the same time, predetermined areas of gate insulating film 12, passivation film 13 and transparent insulating film 23 are removed through an etching treatment in order to expose the metal layer at the terminal sections of scan lines 6 and data lines 5 which have been taken out to the position around the display screen.

On the structure, pixel electrode 2 of thickness 300 nm is formed in a strip shape out of a transparent conductor film made of a material such as the ITO (Indium Tin Oxide) so as to be arranged along the direction perpendicular to the extension of scan lines 6, to be arranged close to one side of an area to be an aperture section of the pixel, and to cover a part of common electrode 1. In this example, common electrode 1 is electrically connected to common electrode lines formed of the first metal layer and/or the second metal layer at the position around the display screen through the contact holes and the upper transparent conductor film, though those are omitted in the drawings.

Example 6

Figure 9A:
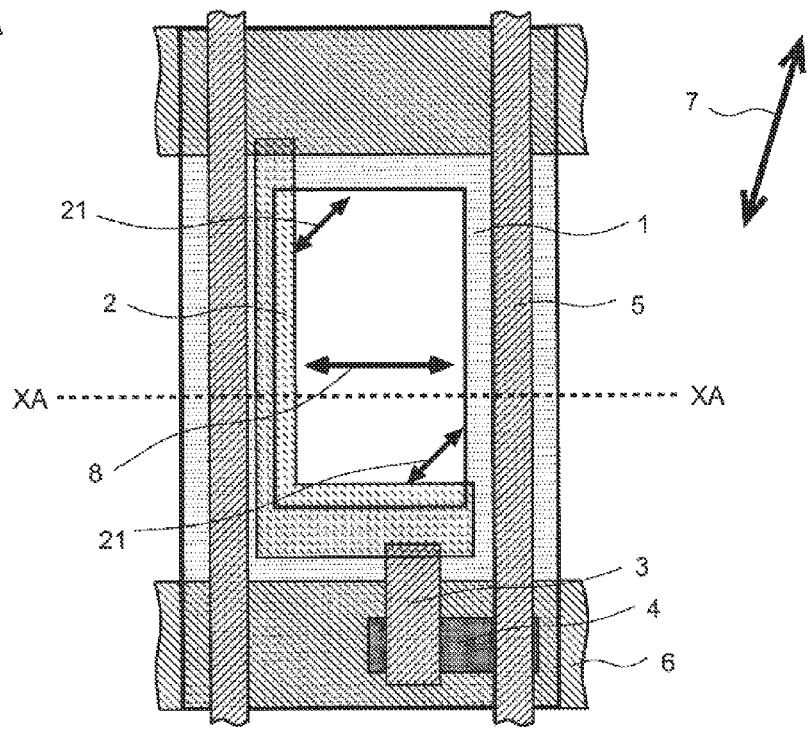
FIGS. 9A and 9B are plan views illustrating structures of two types of pixels: pixel I and pixel II of a liquid crystal display device of Example 6.
Figure 9B:
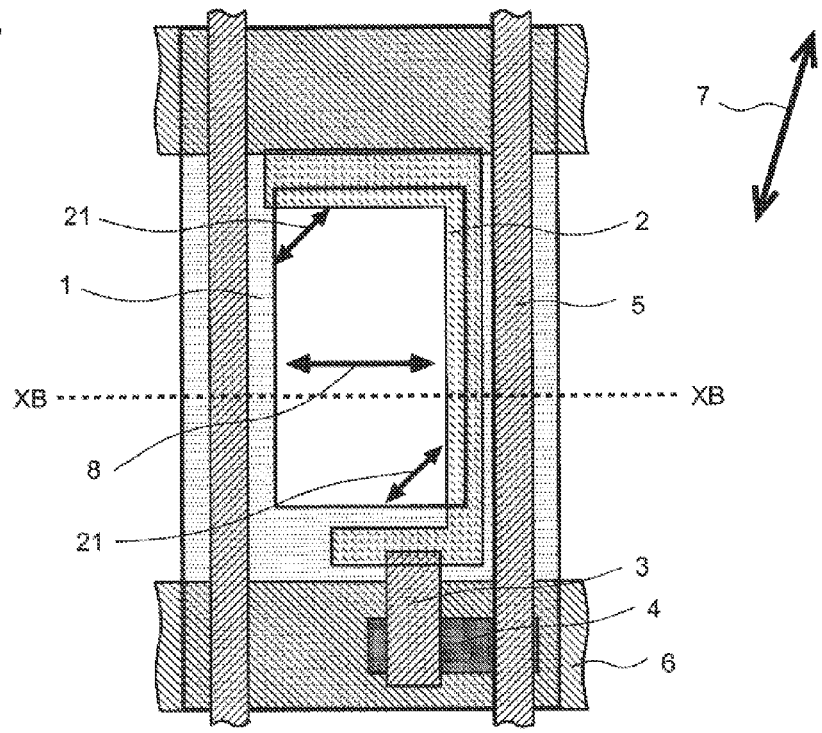
Figure 10A:
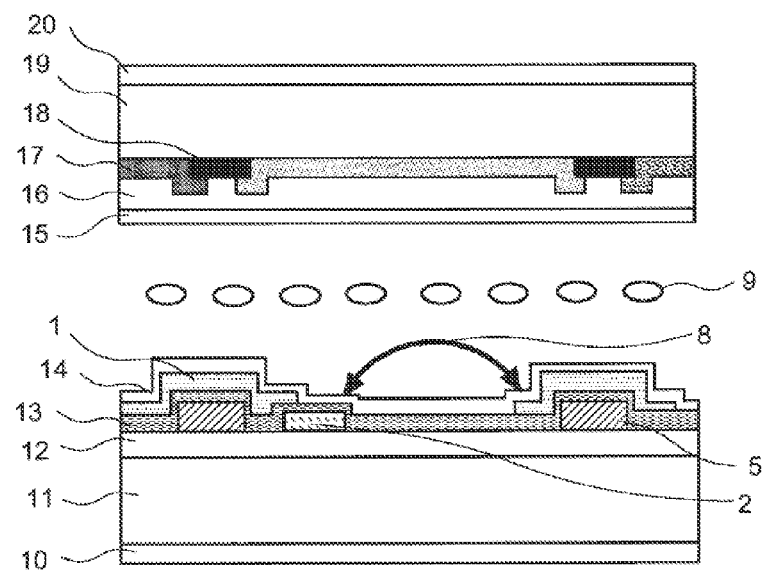
FIGS. 10A and 10B are a sectional view taken along the line XA-XA in FIG. 9A and a sectional view taken along the line XB-XB in FIG. 9B, both illustrating a structure of the liquid crystal display device of Example 6.
Figure 10B:
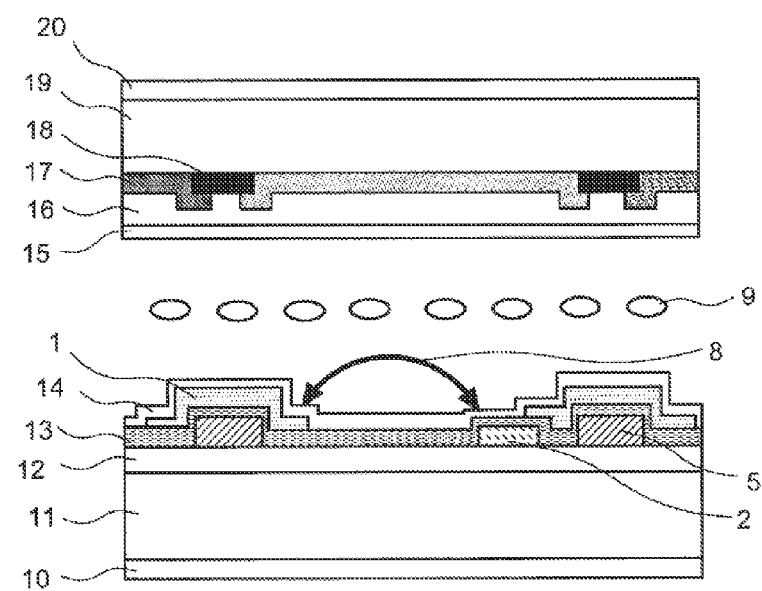

A lateral electric field type liquid crystal display device relating to Example 6 will be described with reference to FIGS. 9A, 9B, 10A and 10B. FIGS. 9A and 9B are plan views illustrating structure of two types of pixels: pixel I and pixel II of the lateral electric field type liquid crystal display device relating to Example 6. FIGS. 10A and 10B are a sectional view of pixel I shown in FIG. 9A taken along line XA-XA and a sectional view of pixel II shown in FIG. 9B taken along line XB-XB, respectively. Example 6 shown in FIGS. 9A to 10B will be described in detail below.

Figure 11:
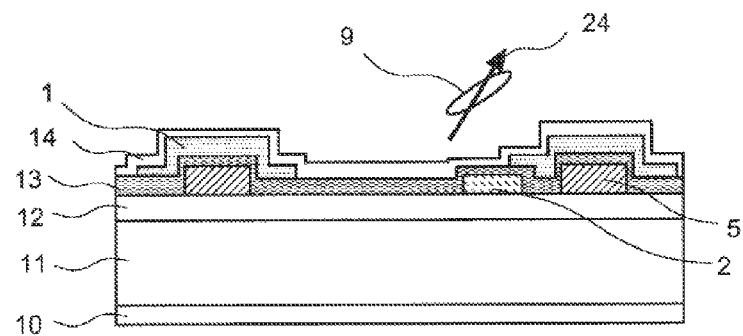
FIG. 11 is a sectional view illustrating an oblique electric field on a pixel in Examples 1 to 5.
Figure 12A:
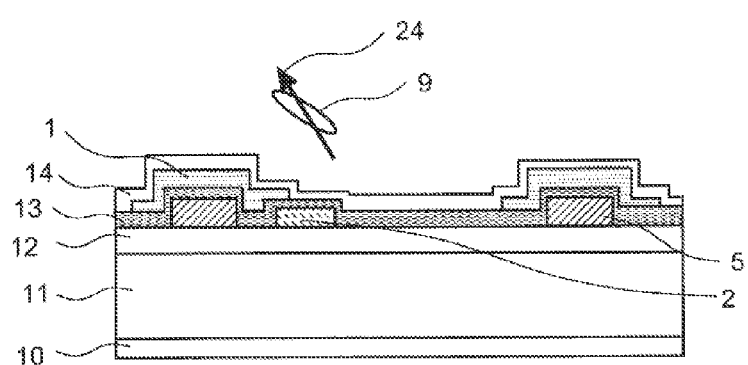
FIGS. 12A and 12B are sectional views illustrating an oblique electric field on pixel I and pixel II in Example 6.
Figure 12B:
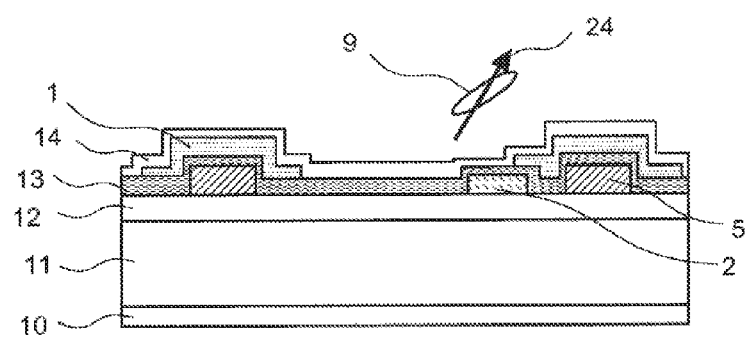

In Examples 1 to 5, pixel electrode 2 is formed so as to be close to one side of a pixel. Accordingly, the positional relationship of common electrode 1 and pixel electrode 2 is the same in each of pixels in the display screen. As can be seen from the sectional view shown in FIG. 11, at the right side and left side of the pixel, the orientations of liquid crystals rose up by oblique electric field 24 generated in an area where common electrode 1 and pixel electrode overlap together become asymmetric. It is an additional problem but is preferable to reduce the asymmetry because deterioration of viewing angle characteristics coming from the liquid crystals with asymmetric orientations.

In order to enhance the viewing angle characteristics, Example 6 provides two types of pixels of pixel I and pixel II, where pixel electrode 2 is arranged at the left side of pixel I as shown in FIG. 9A and pixel electrode 2 is arranged at the right side of pixel II as shown in FIG. 9B. According to the structure, as shown in FIGS. 10A and 10B, the orientations of liquid crystals due to oblique electric field 24 in the area where common electrode 1 and pixel electrode 2 overlap together differ among pixel I and pixel II. Thereby, viewing angle characteristics in the both pixels are compensated to each other, and excellent viewing angle characteristics can be obtained.

In each of the two types of pixels, electrodes are arranged so as not to generate disclination at the edge part of the column. When the direction of liquid crystal alignment 7 is set as shown in FIGS. 9A and 9B, pixel electrode 2 is arranged to project from common electrode 1 at the lower part of the pixel in pixel I and pixel electrode 2 is arranged to project from common electrode 1 at the upper part of the pixel in pixel II. Such the structure can reduce the generation of disclination.

In pixel I and pixel II, electrodes and lines are patterned such that the total sum of the storage capacity formed at the area where common electrode 1 and pixel electrode 2 overlap together and the storage capacity formed at the area where pixel electrode 2 and scan lines 6 overlap together in pixel I is almost the same as that of pixel II. Further, electrodes are arranged such that the aperture section of pixel I is almost the same as that of pixel II. Thereby, the aperture ratios of pixel I and pixel II becomes almost the same.

Example 7

Figure 13A:
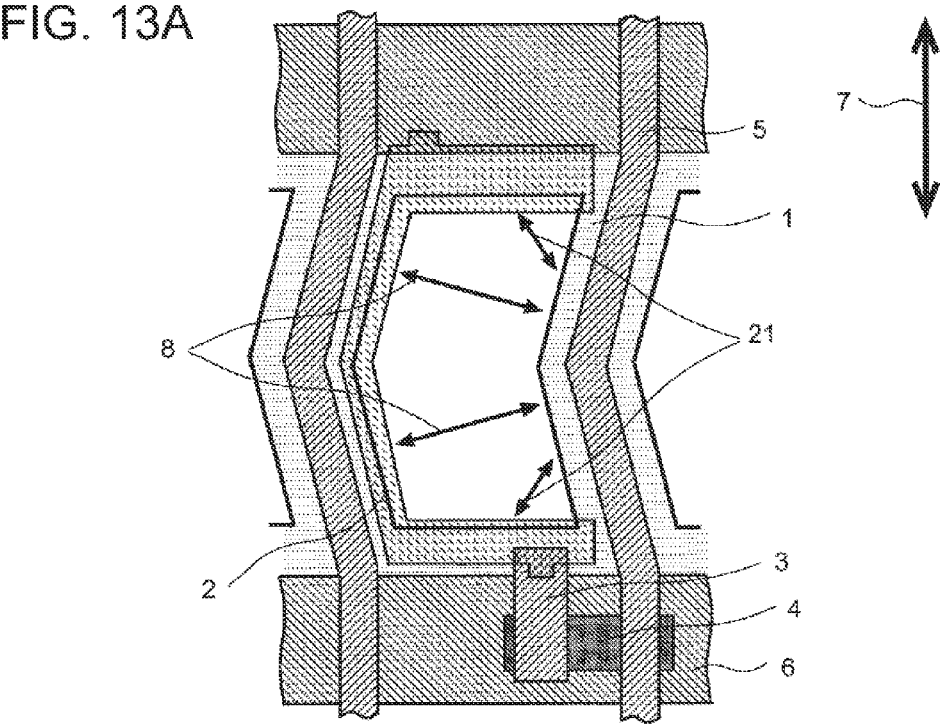
FIGS. 13A and 13B are plan views illustrating structures of two types of pixels: pixel I and pixel II of a liquid crystal display device of Example 7.
Figure 13B:
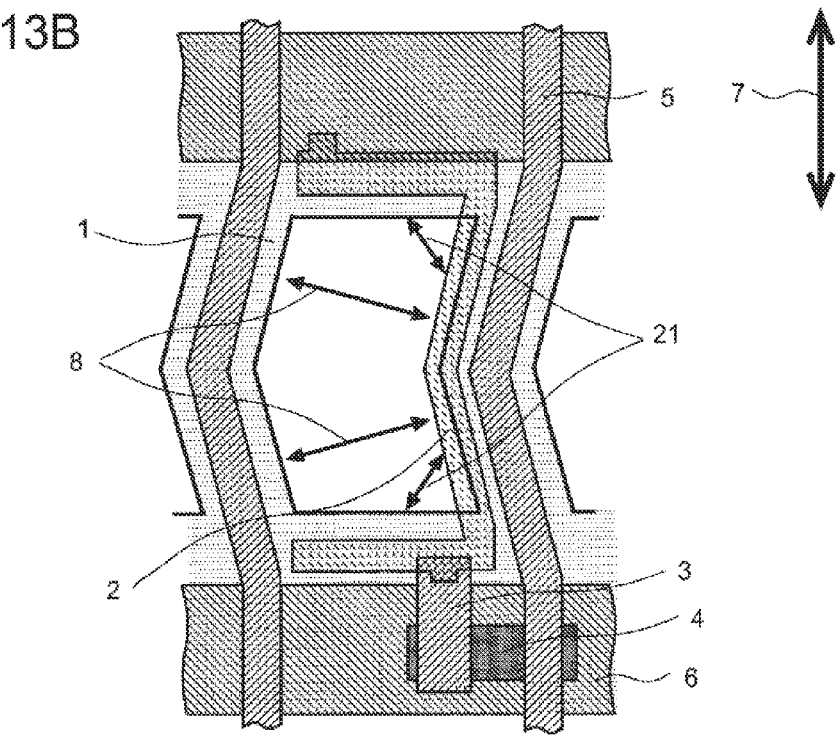

A lateral electric field type liquid crystal display device relating to Example 7 will be described with reference to FIGS. 13A and 13B. FIGS. 13A and 13B are plan views illustrating structure of two types of pixels: pixel I and pixel II of the lateral electric field type liquid crystal display device relating to Example 7. Example 7 shown in FIGS. 13A and 13B will be described in detail below.

In Example 6, when the viewing angle is inclined from the normal direction to the display screen under the condition that liquid crystal is subjected to electric field to be rotated, the retardation when the viewing angle is inclined toward the minor axis of the liquid crystal is different from the retardation when the viewing angle is inclined toward the major axis of the liquid crystal. Therefore, the coloration of the liquid crystal changes depending on the viewing angle, which is an additional problem but is preferably avoided.

In view of this matter, Example 7 provides the structure wherein data lines 5, a part of common electrode 1 arranged with covering the data lines and strip-shaped pixel electrode 2 arranged along one of the data lines are bent to be a symmetric shape including two symmetric parts facing each other in the direction of alignment (initial alignment) of the liquid crystal 7. Thereby, two areas divided on the line where the pixel and its components are bent provide opposite rotation directions of the liquid crystal, which are symmetric areas facing each other in the direction of liquid crystal alignment 7. By using the liquid crystal in the two areas, the optical properties in the major axis and the minor axis directions obtained when the viewing angle is inclined, are compensate to each other, and the coloration of the liquid crystal can be reduced, which is preferable.

In each of the two types of pixels, electrodes are patterned to have the same transmittance and the same amount of storage capacity among the pixels so as not to generate disclination at the edge part of the column. That is, pixel electrode 2 is arranged to project from common electrode 1 at the upper and lower parts of the pixel in pixel I and pixel electrode 2 is arranged not to project from common electrode 1 at the upper part and lower part of the pixel in pixel II. Such the structure can reduce the generation of disclination.

In pixel I and pixel II, electrodes and lines are patterned such that the total sum of the storage capacity formed at the area where common electrode 1 and pixel electrode 2 overlap together and the storage capacity formed at the area where pixel electrode 2 and scan lines 6 overlap together in pixel I is almost the same as that of pixel II. Further, electrodes are arranged such that the aperture section of pixel I is almost the same as that of pixel II. Thereby, the aperture ratios of pixel I and pixel II becomes almost the same.

Example 8

Figure 14:
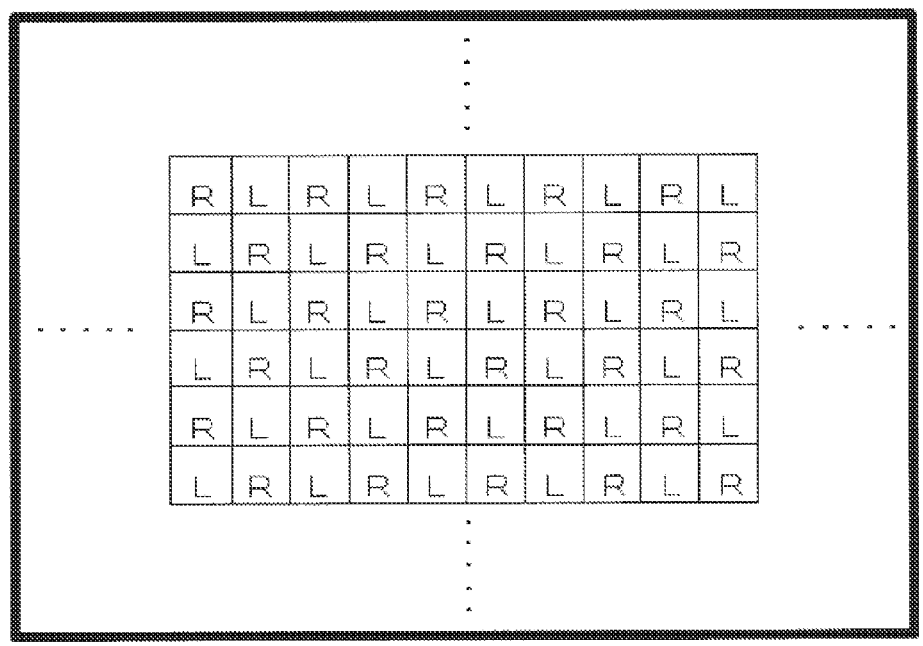
FIG. 14 is a plan view illustrating a structure of a display screen of a liquid crystal display device of Example 8.

A lateral electric field type liquid crystal display device relating to Example 8 will be described with reference to FIG. 14. FIG. 14 is a plan view illustrating a display screen of the lateral electric field type liquid crystal display device relating to Example 8. In FIG. 14, L represents a pixel including a group of sub-pixels corresponding to three colors of blue, green and red each having the structure of pixel I shown in FIG. 13A as one unit; R represents a pixel including a group of sub-pixels corresponding to three colors of blue, green and red each having the structure of pixel II shown in FIG. 13B as one unit.

By arranging those L-pixels and R-pixels are arranged one after the other for any pixels neighboring in the upper, lower, right and left directions, the excellent viewing angle characteristics can be obtained in a well-balanced condition. As the above structure, there are arranged pixels wherein the pixel electrode overlaps with the common electrode part arranged at the same side in one group of sub-pixels corresponding to three colors: blue, green and red. Thereby, viewing angle characteristics are different among the left and right sides for each of RGB colors of the sub-pixels.

Example 9

Figure 15A:
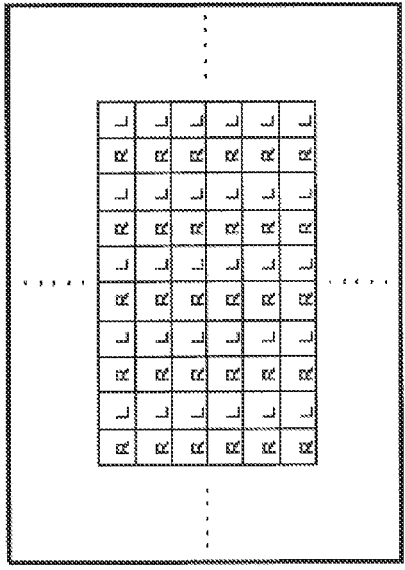
Figure 15B:
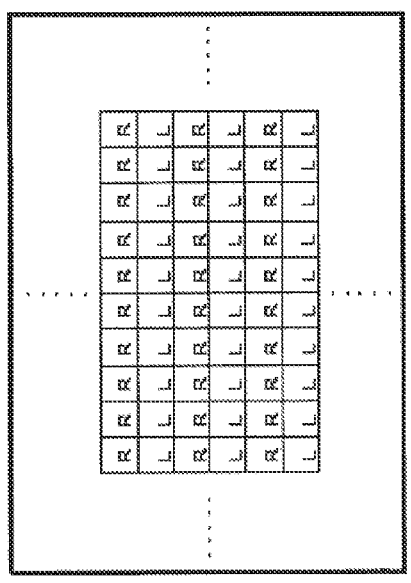
Figure 15C:
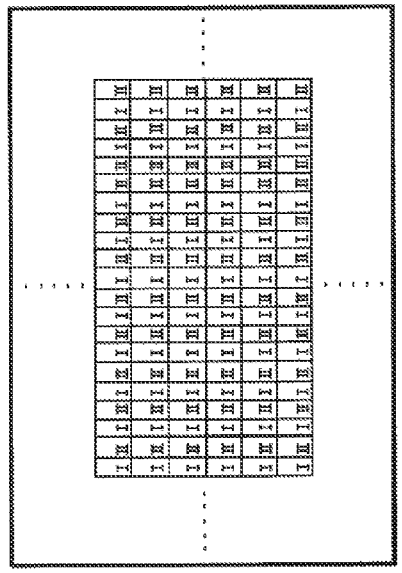
Figure 15D:
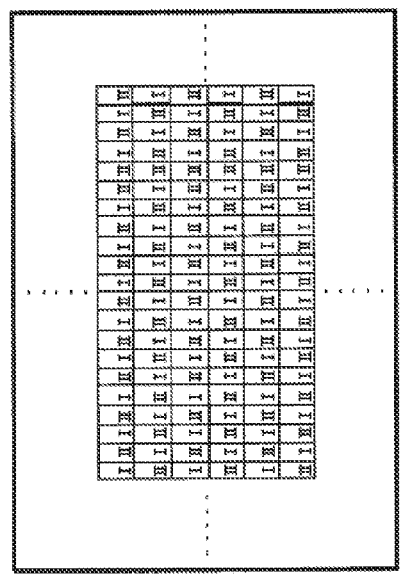

A lateral electric field type liquid crystal display device relating to Example 9 will be described with reference to FIGS. 15A to 15D. Each of FIGS. 15A to 15D is a plan view illustrating a display screen of the lateral electric field type liquid crystal display device relating to Example 9. In FIGS. 15A and 15B, L represents a pixel including a group of sub-pixels corresponding to three colors of blue, green and red each having the structure of pixel I shown in FIG. 13A as one unit; R represents a pixel including a group of sub-pixels corresponding to three colors of blue, green and red each having the structure of pixel II shown in FIG. 13B as one unit. Further, I and II shown in FIGS. 15C and 15D represent pixel I and pixel II shown in FIGS. 13A and 13B, respectively.

Each of FIGS. 15A to 15D are a diagram illustrating the arrangement pattern of pixels I and pixels II other than that shown in Example 8. The arrangement pattern of pixels I and pixels II is not limited to those and may be modified.

Though Examples 8 and 9 have described illustrative display devices employing sub-pixels corresponding to R, G and B colors, sub-pixels of embodiments relating to the present invention are not limited to those as far as a group of sub-pixels compose each pixel. For example, there may be provided sub-pixels corresponding to another color combination such as a combination of Blue, Green, Red and White (RGBW) and a combination of Cyan, Yellow and Magenta (CYM). Further, there may be provided sub-pixels which do not corresponding to colors, as those examples are applied to a monochrome liquid crystal display device which does not represent plural color layers.

Example 10

A lateral electric field type liquid crystal display device relating to Example 10 will be described with reference to FIG. 22. FIG. 22 is a sectional view illustrating one sub-pixel viewed along the data lines of the lateral electric field type liquid crystal display device relating to Example 10, however the counter substrate and the liquid crystal layer are omitted from FIG. 22 for a simple explanation. Example 10 shown in FIG. 22 will be described in detail below.

Example 10 provides the structure similar to that of Example 1 and its manufacturing processes are also the same as those of Example 1. As shown in FIG. 22, electrode pixel 2 includes a projecting part which projects from an area overlapping with the common electrode 1 toward the inside of a pixel, where it is assumed that a is the projection length of the projecting part and b is the interval between the pixel electrode 2 and a part of common electrode 1 at the opposite side of the pixel electrode 2 which are provided for generating a lateral electric field.

In Example 1, the values were set to a=1.5 μm and b=3 μm under the condition that the sub-pixel was 42 μm×14 μm in size, data lines 5 were 3 μm in width, the projecting part of common electrode 1 shielding data line 5 and projecting at the side of overlapping with pixel electrode 2 was 3.5 μm in size, the projecting part of common electrode 1 shielding data line 5 and projecting at the opposite side was 3 μm in size, and pixel electrode 2 was 3 μm in width.

In Example 10, the sub-pixel was 51 μm×17 μm in size, data lines 5 was 3 μm in width, the projecting part of common electrode 1 shielding data line 5 and projecting at the side of overlapping with pixel electrode 2 was 3.5 μm in size and, the projecting part of common electrode 1 shielding data lines 5 and projecting at the opposite side was 3 μm in size. Under the condition, a+b=7.5 μm holds, which comes to be the relationship shown in FIG. 23. Based on a simulation using the relationship, the relationship of a voltage which makes the transmittance the maximum and the value "a" representing the projecting length of the projecting part of pixel electrode 2 from common electrode 1 results in the graph of FIG. 24.

A simulation based on the relationship of a+b=7.5 μm provided a result that the cost of the drive device such as a driver IC can be decreased under the condition that b/a≤3 holds. From a+b=7.5 μm and b/a≤3, a≥1.875 (more than almost 1.9 μm) is given. As can be seen from FIG. 24, the drive voltage which makes the transmittance the maximum comes to be 6-odd V at a=1.875 μm. Herein, the actual drive voltage is generally set to a value which is little smaller than the drive voltage which makes the transmittance the maximum. Accordingly, the drive voltage can be set to 6V or less under the condition that b/a≤3 holds, and the arrangement of the pixel electrode and the common electrode satisfying this condition is preferable in view of the cost of the drive device and electricity consumption.

In view of that, the values of "a" and "b" were set to a=3 μm and b=4.5 μm in Example 10. According to the settings, the voltage comes to be about 5V, which allows a more proper drive operation. Further, the simulation based on the relationship of a+b=7.5 μm resulted in the graph shown in FIG. 25 and the transmittance was enhanced. This result comes from the balance of two types of electric field: a fringe electric field generated in the area where pixel electrode 2 and common electrode 1 overlap together and a lateral electric field generated in the space between an edge of pixel electrode 2 and a part of common electrode 1 arranged with facing the pixel electrode. That is, when the latter electric field is sufficiently stronger than the former electric field, the rising angle of liquid crystal molecules coming from the fringe electric field is not excessively great and deterioration of transmittance coming from the increase of drive voltage is not caused. As the result of the inventors' study, it was found that the value of b/a being 3 or less, and preferably being 2 or less makes a well-balanced condition of the electric fields to avoid the increase of the voltage and keep a high transmittance. The present example can be employed in the embodiments shown in the plan views of FIGS. 13A to 15D.

Example 11

A lateral electric field type liquid crystal display device relating to Example 11 will be described with reference to FIG. 26. FIG. 26 is a sectional views illustrating one sub-pixel viewed along the data lines of the lateral electric field type liquid crystal display device relating to Example 11. Example 11 shown in FIG. 26 will be described in detail below.

Example 11 provides the structure similar to that of Example 5 and its manufacturing processes are also the same as those of Example 5. In Example 5, the sub-pixel was 42 μm×14 μm in size, data lines 5 were 3 μm in width, the projecting part of common electrode 1 shielding data line 5 and projecting at the side of overlapping with pixel electrode 2 was 3.5 μm in size, the projecting part of common electrode 1 shielding data line 5 and projecting at the opposite side was 3 μm in size, the projecting length "a" of pixel electrode 2 from common electrode 1 was 0.5 μm, and pixel electrode 2 was 3 μm in width.

As shown in FIG. 26, it is assumed that "c" is an interval between the side edge of pixel electrode 2 in the overlapping area where the pixel electrode and the common electrode overlap together and the side edge of black matrix 18 in the neighboring pixel. When the sufficient amount of value c is secured, such structure avoids the electric field generated between common electrode 1 and pixel electrode 2 arranged above the common electrode 1 from entering into the aperture section of the neighboring pixel arranged across data line 5. Therefore, this structure can avoid the electric field from driving liquid crystal molecules in unwanted pixels and can avoid the deterioration of the display image quality.

As the result of the inventors' study, it has been found that securing 6 μm or more of the interval "c" which is the distance to the edge of the black matrix 18 in the neighboring pixel can provide an excellent display condition. In the case of Example 5, the arrangement of black matrix 18 to be symmetry with respect to the data line and to be 7 μm in width can solve the above-described problem. Table 1 shows the relationship of values of c and display image quality which have been studied by the inventors.

TABLE 1

| Value of c | Less than 6 μm | 6 μm to 7 μm | More than 7 μm |
|---|---|---|---|
| Display image quality | With problem The lateral electric field can enter the opening aperture of the neighboring pixel, to drive unwanted pixels, resulting in the deterioration of display image quality. | Without problem The display quality does not deteriorate with the aperture ratio being secured efficiently. | Without problem The display quality does not deteriorate. |

Example 11 provides the structure that the sub-pixel was 42 μm×14 μm in size, data lines 5 were 2 μm in width, the projecting part of common electrode 1 shielding data line 5 and projecting at the side of overlapping with pixel electrode 2 was 3.5 μm in size, the projecting part of common electrode 1 shielding data line 5 and projecting at the opposite side was 2 μm in size, the projecting length "a" of pixel electrode 2 from common electrode 1 was 1.5 μm, and pixel electrode 2 was 2 μm in width. In the example, a part of black matrix 18 arranged with facing the data line 5 was set to be 6 μm in width. According to the structure, the interval "c" to the neighboring pixel comes to be 7 μm, which prevents the fringe electric field generated in the overlapping area of pixel electrode 2 and common electrode 1 from entering into the light-transmitting area of the neighboring pixel, which provides an excellent display condition. The present example can be employed in the embodiments of the plan views shown in FIGS. 3, 4, 5, 9A, 9B, 13A, 13B, 14 and 15A to 15D.

While the present embodiments of the present invention have been described using specific terms, such description is for illustrative purpose only, and it is to be understood that changes and variations may be made without departing from the spirit or scope of the appended claims.

The present invention is applicable to any lateral electric field type liquid crystal display devices and any apparatus which employs the same liquid crystal display device as its display device.

The invention claimed is:

1. A lateral electric field type liquid crystal display device configured to perform a display control by changing a molecule orientation of homogeneous-aligned liquid crystal using an electric field almost parallel with substrates of the display device, the display device comprising:
   a first substrate and a second substrate facing each other;
   liquid crystal put between the first substrate and the second substrate;
   a plurality of scan lines and a plurality of data lines both arranged on the first substrate; and a plurality of pixels each of whose boundary is defined by two of the scan lines and two of the data lines,
wherein each of the pixels includes
only one strip-shaped pixel electrode which is arranged to be closer to one of the two data lines than the other and to extend along the one of the two data lines,
a common electrode including a first common electrode part covering the one of the two data lines and a second common electrode part covering the other of the two data lines, and
an insulating film arranged between the pixel electrode and the common electrode, separating the pixel electrode from the common electrode, and
wherein, in each of the pixels, the first common electrode part and the pixel electrode overlap together to form an overlapping area which includes a part extending over the entire length of the pixel electrode along the one of the two data lines,
the pixel electrode includes a projecting part which projects from the overlapping area toward an inside of the each of the pixels, and
a side edge of the projecting part of the pixel electrode is separated from a side edge of the second common electrode part so as to generate a lateral electric field therebetween to drive the liquid crystal.

2. The display device of claim 1,
wherein, in the overlapping area of each of the pixels, the common electrode is arranged at a position closer to the liquid crystal than the pixel electrode.

3. The display device of claim 2,
wherein each of the pixels further includes an insulating film on which the pixel electrode and the data lines are formed.

4. The display device of claim 2,
wherein, in each of the pixels, an insulating film is formed between the pixel electrode and the data lines.

5. The display device of claim 1,
wherein, in the overlapping area of each of the pixels, the pixel electrode is arranged at a position closer to the liquid crystal than the common electrode.

6. The display device of claim 2,
wherein, in each of the pixels, the projecting part of the pixel electrode and the second common electrode part satisfy b/a≤3, where a is a projection length of the projecting part from the overlapping area, and b is an interval between the side edge of the projecting part and the side edge of the second common electrode part.

7. The display device of claim 5, further comprising
a black matrix formed on the second substrate to have a lattice shape along the scan lines and the data lines,
wherein, in each of the pixels, the black matrix and the pixel electrode satisfy c≥6 μm, where c is an interval between a side edge of the pixel electrode in the overlapping area and a farther side edge of a part of the black matrix away from the pixel electrode, the part of the black matrix extending along one of the data lines and being arranged at a boundary between the each of the pixel and a neighboring pixel placed closest to the pixel electrode.

8. The display device of claim 1,
wherein, in each of the pixels, the data lines, the common electrode and the pixel electrode are bent into a symmetric shape including two symmetric parts facing each other in a direction of an initial alignment of the liquid crystal.

9. The display device of claim 1,
wherein, in each of the pixels, the pixel electrode and the common electrode are arranged such that a first rotation direction of the liquid crystal is same as a second rotation direction of the liquid crystal,
where the first rotation direction is a rotation direction of the liquid crystal in an edge part of a space between the pixel electrode and the common electrode to generate a lateral electric field, and
the second rotation direction is a rotation direction of the liquid crystal, in an area around the edge part, rotated by a lateral electric field generated between the side edge of the projecting part of the pixel electrode and the side edge of the second common electrode part.

10. The display device of claim 1,
wherein the plurality of pixels are a plurality of first pixels and a plurality of second pixels,
the first pixels are the pixels in each of which the pixel electrode overlaps with a part of the common electrode arranged at a right side of the each of the first pixels, and
the second pixels are the pixels in each of which the pixel electrode overlaps with a part of the common electrode arranged at a left side of the each of the second pixels.

11. The display device of claim 10,
wherein the plurality of pixels are groups of pixels working as sub-pixels composing one of the first pixels and the second pixels, and
in each of the pixels in one group, the pixel electrode overlaps with a part of the common electrode arranged at a same side of the each of the pixels.

12. A lateral electric field type liquid crystal display device configured to perform a display control by changing a molecule orientation of homogeneous-aligned liquid crystal using an electric field almost parallel with substrates of the display device, the display device comprising:
a first substrate and a second substrate facing each other;
liquid crystal put between the first substrate and the second substrate;
a plurality of scan lines and a plurality of data lines both arranged on the first substrate; and
a plurality of pixels each of whose boundary is defined by two of the scan lines and two of the data lines,
wherein each of the pixels includes
only one strip-shaped pixel electrode which is arranged to be closer to one of the two data lines than the other and to extend along the one of the two data lines,
a common electrode including a first common electrode part covering the one of the two data lines and a second common electrode part covering the other of the two data lines,
an insulating film arranged between the pixel electrode and the common electrode, separating the pixel electrode from the common electrode, and
an overlapping area which is overlapping between the first common electrode part and the pixel electrode, and is extending over the entire length of the pixel electrode along the one of the two data lines, and
wherein, in each of the pixels, the pixel electrode includes a projecting part which projects from the overlapping area toward an inside of the each of the pixels, and
a side edge of the projecting part of the pixel electrode is separated from a side edge of the second common electrode part so as to generate a lateral electric field therebetween to drive the liquid crystal.

* * * * *